United States Patent
Hashiba et al.

(10) Patent No.: US 9,626,096 B2
(45) Date of Patent: Apr. 18, 2017

(54) ELECTRONIC DEVICE AND DISPLAY METHOD

(71) Applicant: KABUSHIKI KAISHA TOSHIBA, Minato-ku, Tokyo (JP)

(72) Inventors: Rumiko Hashiba, Kunitachi (JP); Hiroto Yoshihara, Narashino (JP); Tadatsugu Nunome, Kiyose (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 13/965,592

(22) Filed: Aug. 13, 2013

(65) Prior Publication Data

US 2014/0189594 A1    Jul. 3, 2014

Related U.S. Application Data

(63) Continuation of application No. PCT/JP2013/058384, filed on Mar. 22, 2013.

(30) Foreign Application Priority Data

Dec. 27, 2012 (JP) ................................. 2012-285663

(51) Int. Cl.
*G06F 3/0484* (2013.01)
*G06F 3/0481* (2013.01)
(Continued)

(52) U.S. Cl.
CPC .......... *G06F 3/0488* (2013.01); *G06F 3/0483* (2013.01)

(58) Field of Classification Search
CPC ............................. G06F 3/0484; G06F 3/0481
(Continued)

(56) References Cited

U.S. PATENT DOCUMENTS 6,466,237 B1 * 10/2002 Miyao ................... G06F 3/0483
                                                          707/E17.029
6,496,206 B1 * 12/2002 Mernyk et al. ............... 715/835
(Continued)

FOREIGN PATENT DOCUMENTS

AU       2012101185 A4    8/2012
JP         05-265834 A    10/1993
(Continued)

OTHER PUBLICATIONS

International Search Report mailed by Japan Patent Office on Jun. 25, 2013 in the corresponding PCT application No. PCT/JP2013/058384.

(Continued)

*Primary Examiner* — Tadeese Hailu
*Assistant Examiner* — Darrin Hope
(74) *Attorney, Agent, or Firm* — Knobbe, Martens, Olson & Bear LLP

(57) ABSTRACT

According to one embodiment, an electronic device includes a display controller and a selector. The display controller displays, on a screen, at least one or more note icons corresponding to a note file including a plurality of pages. The selector selects a first note icon displayed on the screen. If a display mode of a note icon transitions from a mode capable of selecting at least one or more note icons to a mode capable of manipulating a page of a first note file corresponding to the first note icon, the display controller displays a transition image including an enlarged image of the first note icon and an enlarged image of a region other than the first note icon.

15 Claims, 20 Drawing Sheets

(51) Int. Cl.
  *G06F 3/0488* (2013.01)
  *G06F 3/0483* (2013.01)
(58) Field of Classification Search
  USPC ........................................................ 715/835
  See application file for complete search history.

(56) References Cited

U.S. PATENT DOCUMENTS

| | | | |
|---|---|---|---|
| 6,545,687 B2 | 4/2003 | Scott et al. | |
| 7,877,460 B1 | 1/2011 | Brouwer et al. | |
| 9,275,028 B2 | 3/2016 | Migos et al. | |
| 2004/0093565 A1* | 5/2004 | Bernstein | G06F 17/242 715/268 |
| 2008/0062141 A1 | 3/2008 | Chandhri | |
| 2009/0002335 A1 | 1/2009 | Chaudhri | |
| 2009/0172532 A1 | 7/2009 | Chaudhri | |
| 2009/0183114 A1 | 7/2009 | Matulic | |
| 2009/0198359 A1 | 8/2009 | Chaudhri | |
| 2010/0251106 A1* | 9/2010 | Barrus | G06F 3/04883 715/268 |

FOREIGN PATENT DOCUMENTS

| | | |
|---|---|---|
| JP | 10-198337 A | 7/1998 |
| JP | 11-039132 A | 2/1999 |
| JP | H11-259458 A | 9/1999 |
| JP | 11-345242 A | 12/1999 |
| JP | 2000-075977 A | 3/2000 |
| JP | 2004-021522 A | 1/2004 |
| JP | 2004-078815 A | 3/2004 |
| JP | 2009-169537 A | 7/2009 |
| JP | 2010-503130 A | 1/2010 |
| JP | 2010-049475 A | 3/2010 |
| JP | 2012-195952 A | 10/2012 |
| WO | WO 2014/103366 A1 | 7/2014 |

OTHER PUBLICATIONS

Junichi Rekimoto, "The Information Cube: Using Semitransparency in 3D Information Visualization," Computer Software, vol. 11, pp. 63-74, Nov. 15, 1994.
First Office Action mailed by Japan Patent Office on Jun. 24, 2014 in the corresponding Japanese Patent Application No. 2012-285663—7 pages.
An English translation of International Search Report mailed by Japan Patent Office on Jun. 25, 2013 in the corresponding PCT Application No. PCT/JP2013/058384—1 page.
English translation of International Preliminary Report on Patentability issued by the International Bureau of WIPO on Jun. 30, 2015 in the corresponding PCT application No. PCT/JP2013/058384—7 pages.
"50 Questions about Vista" *Nikkei WinPC*, Nikkei BP, Mar. 1, 2007, 13(4), p. 59—6 pages.
Shinji Shioda, "Saint Vista School," *Weekly ASCII*, ASCII Media Works, May 26, 2009, 736, p. 55—6 pages.
First Office Action mailed by Japan Patent Office on Feb. 16, 2016 in the corresponding Japanese patent application No. 2015-049748—6 pages.
The extended European search report issued by European Patent Office on Jun. 27, 2016 in the corresponding European Patent application No. 13742144.2—8 pages.

* cited by examiner

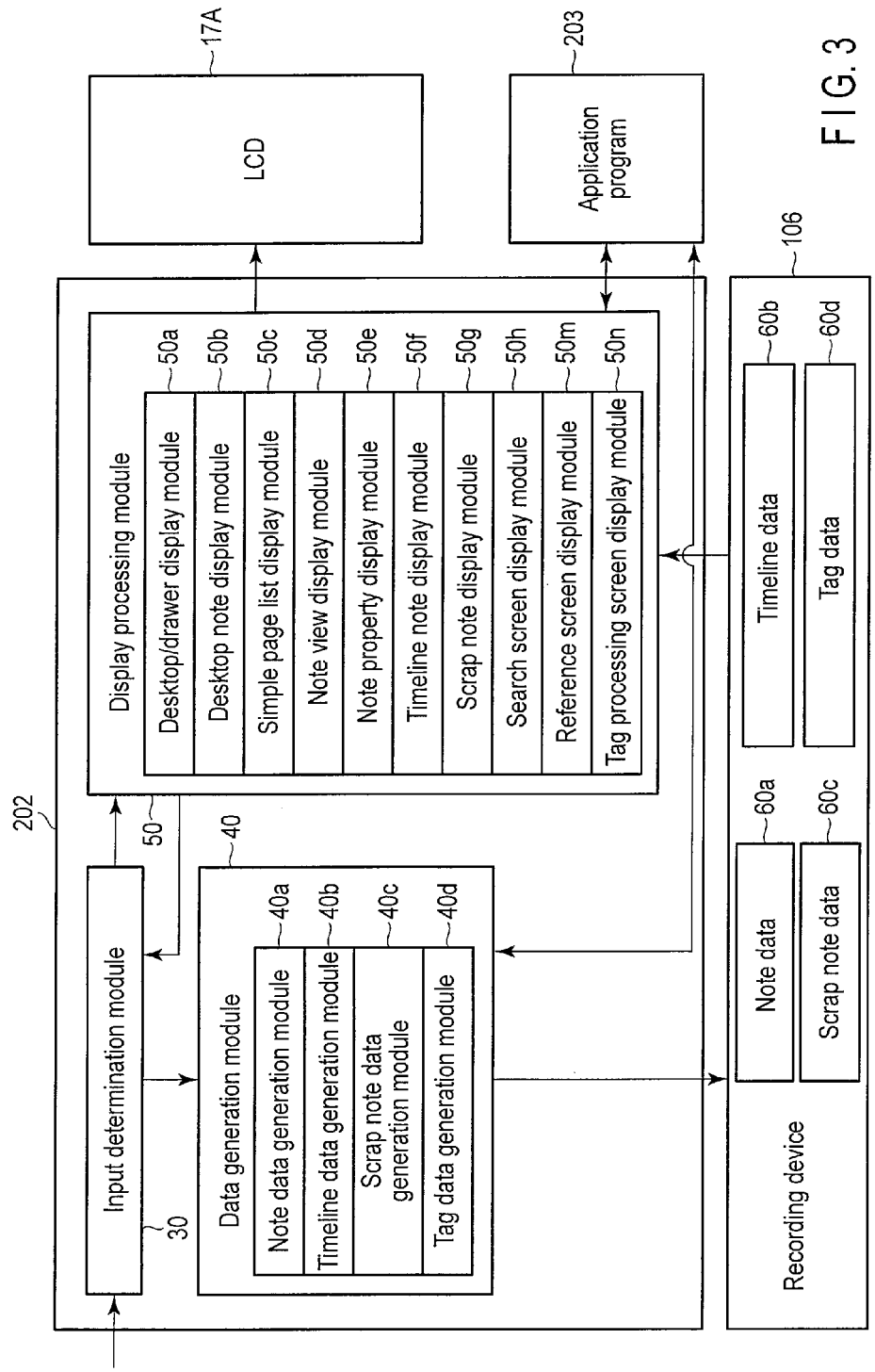
F I G. 3

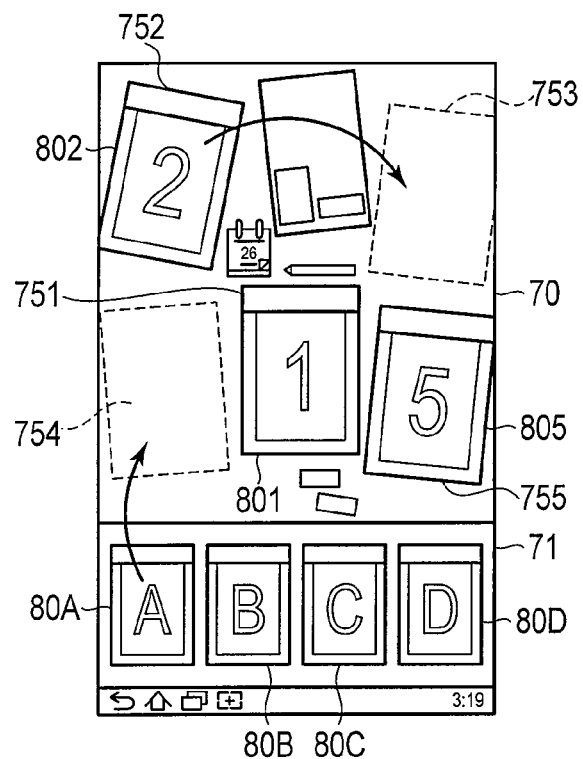
F I G. 7
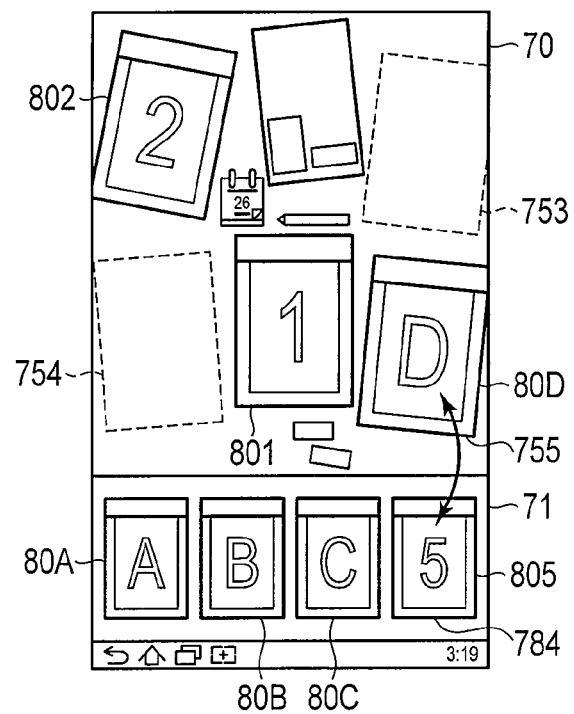
F I G. 8

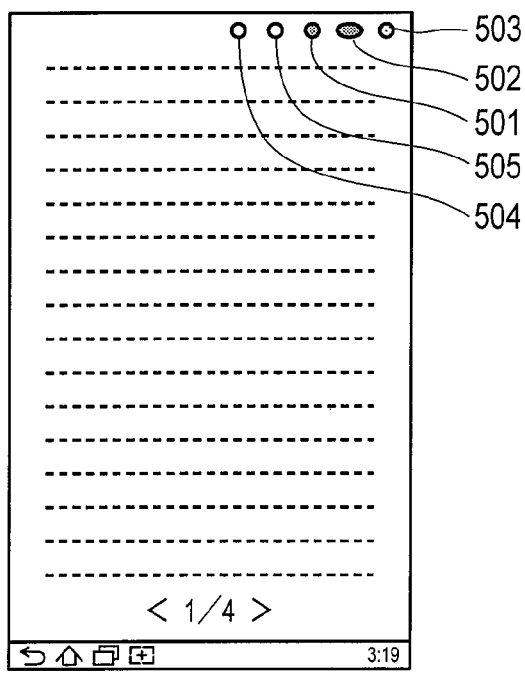
F I G. 23
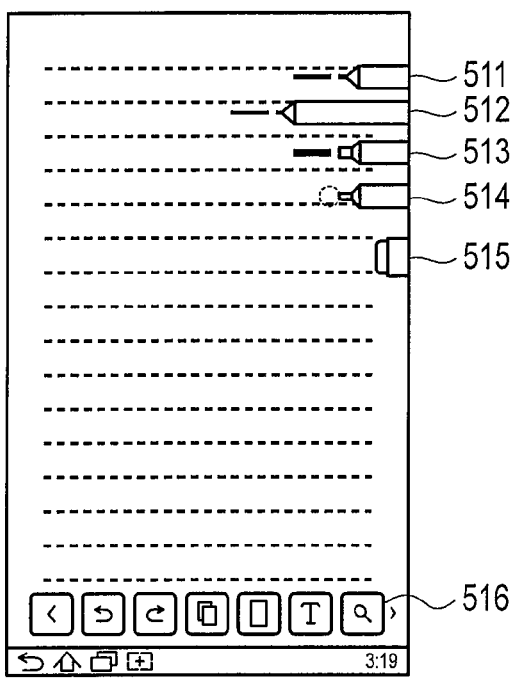
F I G. 24

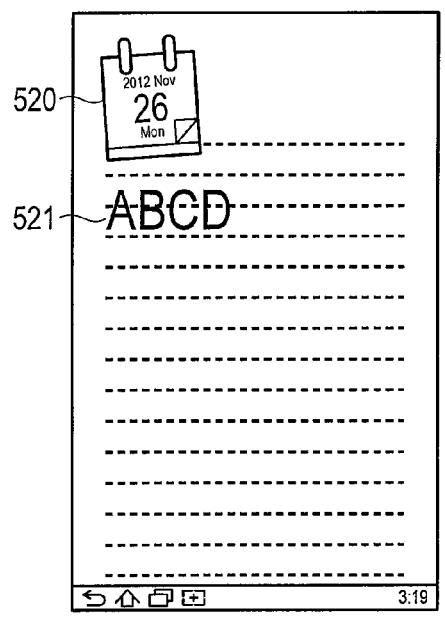
F I G. 25
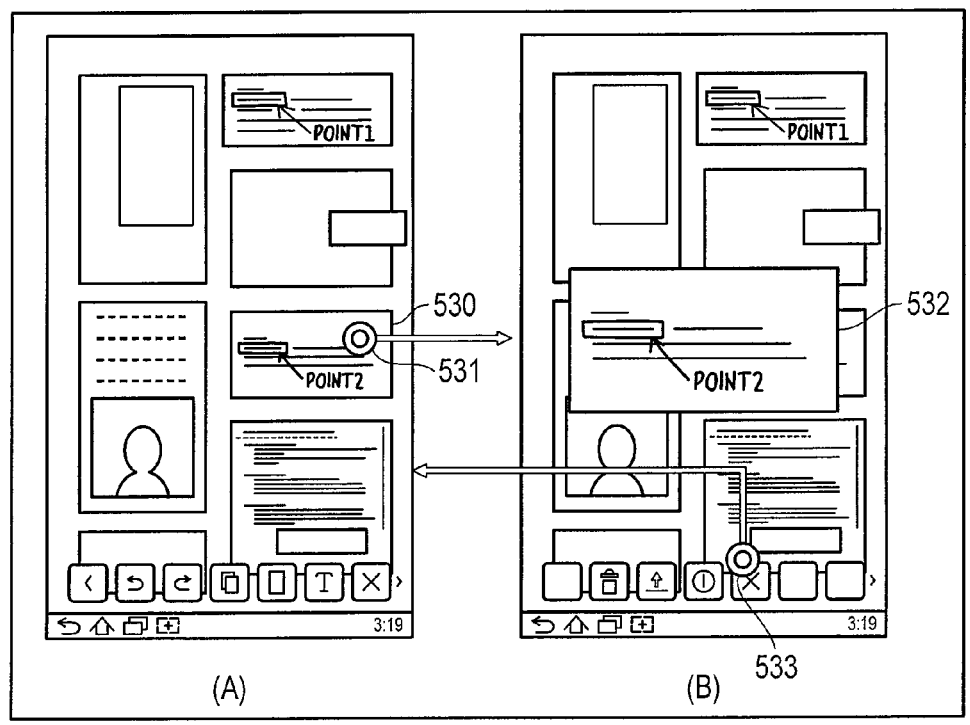
F I G. 26

ELECTRONIC DEVICE AND DISPLAY METHOD

CROSS-REFERENCE TO RELATED APPLICATIONS

This application is a Continuation Application of PCT Application No. PCT/JP2013/058384, filed Mar. 22, 2013 and based upon and claiming the benefit of priority from Japanese Patent Application No. 2012-285663, filed Dec. 27, 2012, the entire contents of all of which are incorporated herein by reference.

FIELD

Embodiments described herein relate generally to a display of a screen for user interface.

BACKGROUND

In recent years, various kinds of electronic devices, such as a tablet, a PDA and a smartphone, have been developed. Most electronic devices of this type include a touch screen display so as to facilitate user's input operation.

By touching menus or objects, which are displayed on a touch screen display, with a pen or his/her finger, a user can instruct a portable electronic device to perform functions associated with the menus or the objects. Also, by handwriting characters or figures with a pen on a touch screen display, a user can input stroke data of the handwritten characters or figures.

In an electronic device capable of a touch operation with a pen or finger, there is a need for a user interface that can intuitively use functions provided for data management as well as data input or edit by a touch operation.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a diagram illustrating a functional configuration implemented by a handwriting input program of the embodiment.

FIG. 7 is a diagram illustrating an example of the desktop/drawer screen of the embodiment.

FIG. 8 is a diagram illustrating an example of the desktop/drawer screen of the embodiment.

FIG. 23 is a diagram illustrating an example of a note view screen of an embodiment.

FIG. 24 is a diagram illustrating an example of a page view screen of a menu display mode of an embodiment.

FIG. 25 is a diagram illustrating an example of a timeline note screen of an embodiment.

FIG. 26 is a diagram illustrating an example of a scrap note screen of an embodiment.

DETAILED DESCRIPTION

Various embodiments will be described hereinafter with reference to the accompanying drawings.

In general, according to one embodiment, an electronic device includes a display controller and a selection unit. The display controller displays, on a screen, at least one or more note icons corresponding to a note file including a plurality of pages. The selection unit selects a first note icon displayed on the screen. The display controller displays a transition image including an enlarged image of the first note icon and an enlarged image of a region other than the first note icon, if a display mode of a note icon transitions from a mode capable of selecting at least one or more note icons to a mode capable of manipulating a page of a first note file corresponding to the first note icon.

Figure 1:
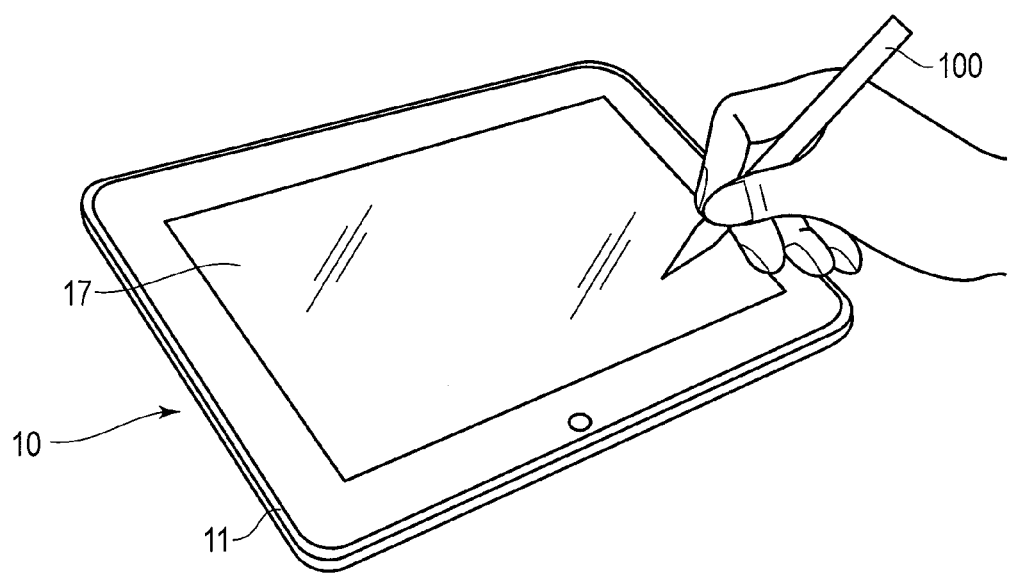
FIG. 1 is a perspective view illustrating an external appearance of an electronic device according to an embodiment.

FIG. 1 is a perspective view illustrating an external appearance of an electronic device according to an embodiment. The electronic device is a portable electronic device in which characters handwritten with, for example, a pen or finger, can be input. The electronic device may be implemented as a tablet computer, a notebook personal computer, a smartphone, a PDA, or the like. In the following, a case where the electronic device is implemented as a tablet computer 10 will be assumed. The tablet computer 10 is a portable electronic device, also called a tablet or slate computer, and includes a main body 11 and a touch screen display 17 as illustrated in FIG. 1. The touch screen display 17 is mounted to superimpose on the top surface of the main body 11.

The main body 11 includes a thin-box-shaped housing. The touch screen display 17 includes a flat display, and a sensor (position detection device) configured to detect a position designated by a pen or finger on a screen of the flat display. The flat display may be, for example, a liquid crystal display (LCD). As an example of the sensor (position detection device), an electrostatic capacitance type touch panel or an electromagnetic induction type digitizer may be used. The sensor (position detection device) detects a position which a pen or finger touches or comes close to. In the following, a case where both the two types of sensors, the digitizer and the touch panel, are included in the touch screen display 17 will be assumed.

Each of the digitizer and the touch panel is provided to cover the screen of the flat display. The touch screen display 17 may detect a screen touch operation using a pen 100 as well as a screen touch operation using a finger. The pen 100 may be, for example, an electromagnetic induction pen. A user is enabled to perform a handwriting input operation on the touch screen display 17 by using an external object (pen 100 or finger). When the handwriting input operation is performed on the touch screen display 17, a locus of a movement of the external object (pen 100 or finger) on the screen, that is, a locus (handwriting) of a stroke handwritten by the handwriting input operation, is displayed in real time. The locus of one stroke corresponds to a variation in a touch position (coordinate) of the external object while the external object touches the screen. A handwritten document is generally constituted by a set of a plurality of strokes, that is, a set of plurality of loci (handwriting), which corresponds to handwritten characters or figures.

The tablet computer 10 (electronic device) of the present embodiment records data of handwritten strokes as time-series information (stroke information) representing an order relation between a coordinate data sequence indicating each stroke locus and the stroke, instead of image data. The time-series information refers to a set (stroke data sequence) of time-series coordinate data (coordinate data sequence) corresponding to each of the plurality of strokes. The order relation between the strokes represents the order in which the strokes are handwritten, that is, the stroke order.

The tablet computer 10 may read existing arbitrary time-series information from a storage medium and display, on the screen, a handwritten document corresponding to the time-series information, that is, a locus corresponding to each of the plurality of strokes represented by the time-series information.

In the present embodiment, for example, the time-series information (stroke data sequence) is managed in page units. The tablet computer 10 performs data management by a note file including page data of at least one page. Also, the page data may include image data or text data, as well as the time-series information (stroke data sequence). Also, the tablet computer 10 may manage the time-series information (stroke data sequence) in association with other data. Examples of other data may include date and time data representing date and time, image or text data, and tag data.

Figure 2:
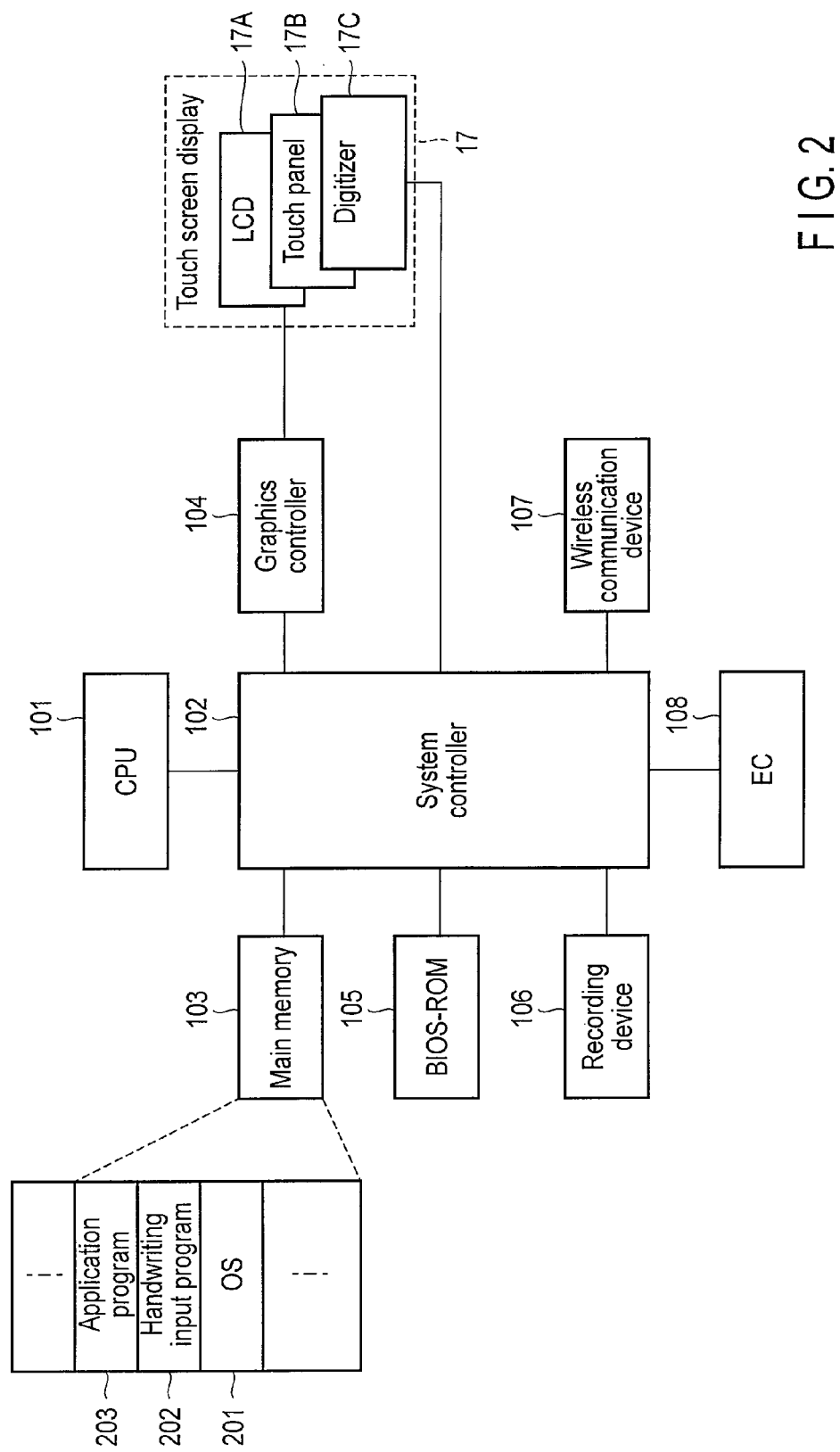
FIG. 2 is a diagram illustrating a system configuration of a tablet computer in the embodiment.

FIG. 2 is a diagram illustrating a system configuration of the tablet computer 10 in the embodiment.

The tablet computer 10, as illustrated in FIG. 2, includes a CPU 101, a system controller 102, a main memory 103, a graphics controller 104, a BIOS-ROM 105, a recording device 106, a wireless communication device 107, an embedded controller (EC) 108, and the like.

The CPU 101 is a processor that controls operations of various modules inside the tablet computer 10. The CPU 101 executes various programs that are loaded from the recording device 106 on the main memory 103. The programs executed by the CPU 101 include an operating system (OS) 201 and various application programs. The application programs include a handwriting input program 202 and other application programs 203. Examples of other application programs 203 include a handwritten character recognition program, a browser program, an image editing program, and a word processing program.

By executing the handwriting input program 202, the CPU 101 realizes a function of generating note data (page data (time-series information)) according to a handwriting input operation using the pen 100, a page edit function of editing a page included in a note file, and various functions related to generation and edit of a note file (or page).

Also, the CPU 101 also executes a basic input/output system (BIOS) stored in the BIOS-ROM 105. The BIOS is a program for hardware control.

The system controller 102 is a device that connects local buses of the CPU 101 and various components. The system controller 102 is also embedded with a memory controller that controls an access to the main memory 103. Also, the system controller 102 also has a function of performing communication with the graphics controller 104 via a serial bus or the like.

The graphics controller 104 is a display controller that controls an LCD 17A used as a display monitor of the tablet computer 10. A display signal generated by the graphics controller 104 is transmitted to the LCD 17A. The LCD 17A displays a screen image based on the display signal. On the LCD 17A, a touch panel 17B and a digitizer 17C are disposed as a position detection device. The touch panel 17B is an electrostatic capacitance type pointing device configured to perform an input on the screen of the LCD 17A. A touch position touched on the screen by the finger and a movement of the touch position or the like is detected by the touch panel 17B. The digitizer 17C is an electromagnetic induction type pointing device configured to perform an input on the screen of the LCD 17A. A touch position touched on the screen by the pen 100 and a movement of the touch position or the like is detected by the digitizer 17C.

The wireless communication device 107 is a device configured to perform wireless communication such as wireless LAN or 3G mobile communication and the like.

The EC 108 is one-chip microcomputer including an embedded controller for power management. The EC 108 has a function of powering on or off the tablet computer 10 according to a user's power button operation.

Next, the functional configuration realized by the handwriting input program 202 in the present embodiment will be described with reference to FIG. 3. By executing the handwriting input program 202, the CPU 101 realizes functions of an input determination module 30, a data generation module 40, a display processing module 50, and the like.

The input determination module 30 inputs data representing the touch position on the screen and movement of the touch position. The touch position and the movement are detected by the touch screen display 17, according to input operation using the pen 100 or finger. Based on a user interface screen displayed on the LCD 17A by the display processing module 50, the input determination module 30 determines whether data for generating the note data (page data) by the data generation module 40 is input, or whether data representing a operation (gesture operation or the like) for the user interface screen displayed by the display processing module 50 is input.

The data generation module 40 generates various data based on stroke data input through user interface screens for various functions, which are displayed on the LCD 17A by the display processing module 50. The data generation module 40 includes a note data generation module 40a, a timeline data generation module 40b, a scrap note data generation module 40c, and a tag data generation module 40d.

The note data generation module 40a generates page data in page units included in the note file, based on stroke data input through a screen (note view screen) displayed by a note view display module 50d (described below). The note data generation module 40a records a plurality of note files in the recording device 106 as note data 60a. Also, the note data generation module 40a records a variety of page-related information as the note data 60a in association with each page. Examples of the page-related information include information on generated date and time, updated date and time, accessed date and time, presence or absence (type) of tag, file lock, template type, and paper setup.

Based on stroke data input through a screen (timeline note screen) displayed by a timeline note display module 50f (described below), the timeline data generation module 40b generates timeline data 60b by associating page data and temporary data with each other, and records the timeline data 60b in the recording device 106.

The scrap note data generation module 40c cooperates with other application program 203 (for example, the browser program, the image editing program, the word processing program, and the like) which is different from the handwriting input program 202, and generates scrap note data 60c, which records an image of an entire screen or a partial screen designated by the user from a screen displayed by the application program 203, through a screen displayed by a scrap note display module 50g (described below), and records the scrap note data 60c in the recording device 106. The scrap note data 60c may be used to display the scrap note screen by the scrap note display module 50g, and may be imported to page data through the scrap note screen.

Based on stroke data input through a tag processing screen display module 50n (described below), the tag data generation module 40d generates tag data 60d and records the tag data 60d in the recording device 106.

The display processing module 50 displays user interface screens on the LCD 17A according to various functions. The display processing module 50 performs display processing according to a operation with respect to the user interface screen, for example, a operation of selecting an object (a note icon, a page, a button icon, a gadget icon, or the like), a operation of editing a page, and the like. The display processing module 50 includes a desktop/drawer display module 50a, a desktop note display module 50b, a simple page list display module 50c, a note view display module 50d, a note property display module 50e, a timeline note display module 50f, a scrap note display module 50g, a search screen display module 50h, a reference screen display module 50m, and a tag processing screen display module 50n.

The desktop/drawer display module 50a displays a desktop/drawer screen being a basic screen by the handwriting input program 202. The desktop/drawer display module 50a displays, on the desktop/drawer screen, at least one or more note icons corresponding to a note file including a plurality of pages. The desktop/drawer display module 50a provides, on the desktop/drawer screen, a storage region for displaying a note icon representing a note file which has been completely generated and a temporary region for displaying a note icon representing a note file being during operation which is moved from the storage region, and displays the note icons in the respective regions (details will be described below). A plurality of note icons may be displayed in each of the storage region and the temporary region. When there is an input operation of designating a note icon displayed in the temporary region or the storage region on the screen, the desktop/drawer display module 50a selects the note icon according to the input operation and displays a transition image to transition a page of a note file corresponding to the note icon to a manipulable form (desktop note screen). The transition image includes an enlarged image of the note icon, and an enlarged image of a region other than the note icon (around the note icon). Also, the desktop/drawer display module 50a may enlarge a display range of the storage region and switch to a grid display in which the note icon is disposed in a grid shape.

The desktop note display module 50b displays a desktop note screen for page edit with respect to the note file corresponding to the note icon selected on the desktop/drawer screen. Examples of the page edit include a display switch (page up/down) to a page to be browsed, a page insertion (addition), a page copy/paste, and the like. Also, the desktop note display module 50b displays, on the desktop note screen, a plurality of function icons or a plurality of button icons for transition to other functions. Examples of the function icons include a pen icon for transition to a note data generation function, a calendar icon for transition to a timeline note function, a scrap note icon for transition to a scrap note function, and a tag icon for transition to a tag function.

When the note icon displayed in the storage region (grid display) of the desktop/drawer screen is designated by the input operation, the simple page list display module 50c displays a simple page list screen that views a list of pages included in the note file corresponding to the designated note icon.

At the time of executing the note data generation function, the note view display module 50d displays a note view screen to edit data of pages included in the note file. For example, the note view display module 50d displays the note view screen according to the page selection from the simple page list screen, or the page selection or the function icon (pen icon) or button icon selection in the desktop note screen. In addition to the stroke data according to the handwriting input operation using the pen 100 in page units, the image data or text data generated by other application programs, the data selected from the scrap note generated by the scrap note function, and the like are input to the note view screen. The note view display module 50d provides various tools for input of stroke data on the note view screen. For example, a setting tool is provided to set a width or color of the stroke (locus) displayed according to the input operation using the pen 100, a width of an eraser that erases the displayed stroke (locus), or the like.

For example, when the property display of the note file is instructed in the desktop note screen by the selection of the button icon, the note property display module 50e displays a note property screen that views the property of the note file subjected to page edit.

When the function icon (calendar icon) is selected in the desktop note screen, the timeline note display module 50f displays a timeline data screen for generating timeline data by associating temporary data and page data with each other by the timeline data function.

When the cooperating application program 203 starts up, the scrap note display module 50g displays a screen having captured an image displayed by the application program 203 (capture mode), and displays a screen for selecting (clipping) an image of an entire screen or a partial screen, which is added to the scrap note data 60c, according to a user operation. In the image added to the scrap note data 60c, handwritten character or the like (stroke data sequence) may be added by the handwriting input operation using the pen 100. Also, when the function icon (scrap note icon) is selected in the desktop note screen, the scrap note display module 50g displays the scrap note screen based on the scrap note data 60c. The scrap note display module 50g may display a list of images included in the scrap note data 60c and paste an image selected from the list to a page.

When a search icon displayed in the desktop/drawer screen, the desktop note screen, the note view screen, or the like is selected, the search screen display module 50h displays a search screen for searching note files or pages by the search function. In the search screen, a stroke sequence to be a search key may be input by, for example, the handwriting using the pen 100.

The reference screen display module 50m displays a page searched based on the search key (stroke sequence) by the search function. For example, the reference screen display module 50m may display a page group including the stroke sequence corresponding to the search key by a thumbnail list, and enlarge and display a page designated from the thumbnail list. Also, in the thumbnail or page display screen, the reference screen display module 50m displays the strokes part corresponding to the search key in a form different from other parts by, for example, highlighting. Also, in the note icon or page list display, the reference screen display module 50m may display the list by sorting the note icons or pages (sort function) according to attribute data designated by the user (for example, generated date and time, updated date, similarity to search key, last browsed date, number of times of display, or the like). Also, in the note icon or page list display, the reference screen display module 50m may specify and display only a note icon or page corresponding to a condition designated by the user (filter function). For example, when the user designates attribute data (for example, a type of a tag added to a page), the filter function extracts only a note icon or page corresponding to the attribute data from the note data 60a and displays the extracted note icon or page.

When the function icon (tag icon) is selected in the desktop note screen, the tag processing screen display module 50n displays a screen that adds a tag to a page subjected to page edit. For example, the tag processing screen display module 50n adds an image representing a tag (for example, a rectangular image of a color different from page display) to a predetermined position of a page displayed on the desktop note screen. Also, when a tag icon button is selected from the menu, the tag processing screen display module 50n displays a tag menu that lists a plurality of types of different tags. In the tag menu, a plurality of tags each having, for example, a different display color is displayed. The tag processing screen display module 50n adds a tag selected from the tag menu to a page, and displays a screen that returns the tag to the menu according to a operation of peeling the tag added to the page. Also, the tag processing screen display module 50n displays strokes (handwriting) in the tag according to a stroke sequence representing handwritten input characters or the like with respect to the tag in the menu.

Next, the operation of the tablet computer 10 of the present embodiment will be described. First, display processing of the desktop/drawer screen by the desktop/drawer display module 50a will be described.

When the handwriting input program 202 starts up, the display processing module 50 displays the desktop/drawer screen on the LCD 17A by the desktop/drawer display module 50a.

Figure 4:
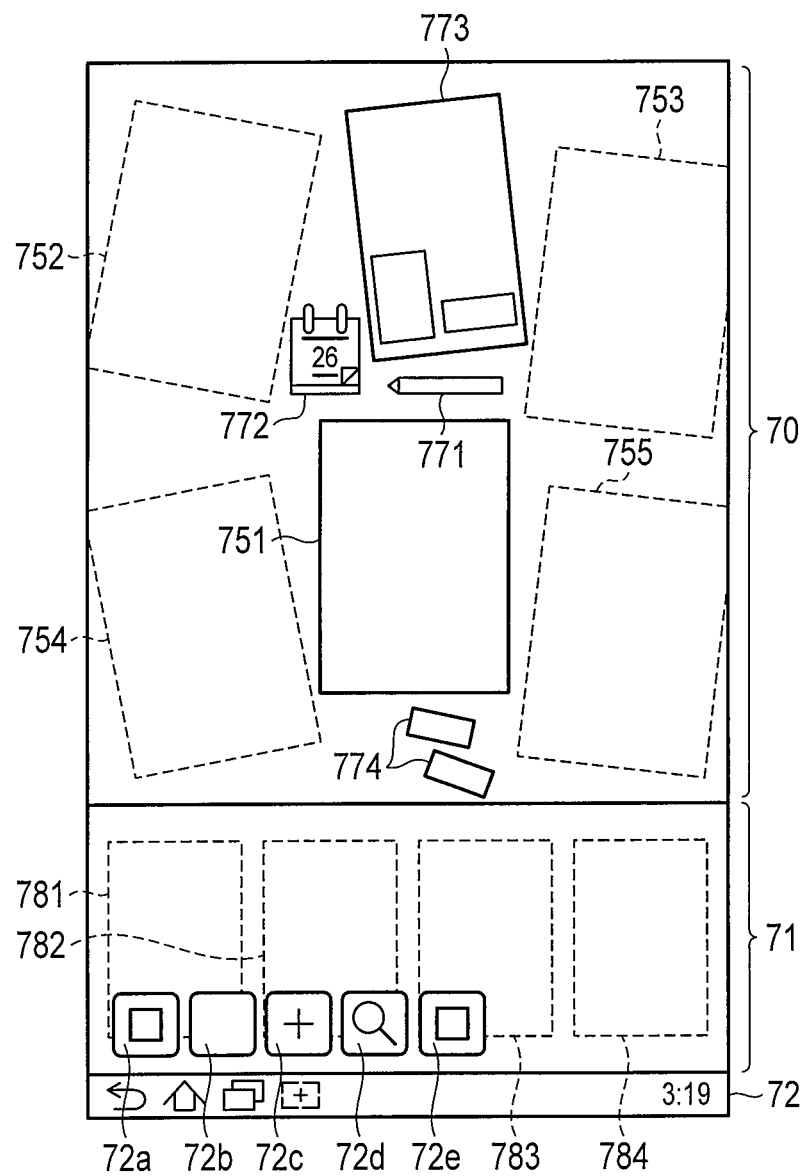
FIG. 4 is a diagram illustrating a display example of an initial state of a desktop/drawer screen of the embodiment.

FIG. 4 is a diagram illustrating a display example of an initial state of the desk/drawer screen of the embodiment, in which no note file is generated.

The desktop/drawer screen includes a storage region 71 for displaying a note icon representing a note file which has been completely generated and a temporary region 70 for displaying a note icon representing a note file being during operation. Also, the desktop/drawer display module 50a displays a plurality of button icons 72a, 72b, 72c, 72d and 72e (context buttons) corresponding to the desktop/drawer screen in a lower portion of the desktop/drawer screen. Also, the functions corresponding to the respective button icons 72a to 72d will be described below.

Note icons of note files including pages generated by the note data generation function are displayed in the storage region 71. In the example illustrated in FIG. 4, note icon regions 781, 782, 783 and 784 displaying four note icons are provided in the storage region 71. The temporary region 70 may display four or more note icons by expanding a display range by a predetermined operation.

The temporary region 70 includes a first region 751, a second region 752, a third region 753, a fourth region 754, and a fifth region 755 displaying five note icons. The first region 751 disposed in the center represents a position previously determined as an edit location of a note file. The first region 751 is a move destination of a note icon to be edited which is selected from the storage region 71 or the temporary region 70. The note icon moved to the first region 751 transitions to a form capable of operating the pages of the note file.

The note icon designated from the storage region 71 may be moved to the other four regions, the second region 752 to the fifth region 755. In the storage region 71, the note icons are arranged and displayed in a grid shape (herein, horizontal direction) along a normal direction of the display screen. In the temporary region 70, the note icons are displayed in a state in which the four regions, the second region 752 to the fifth region 755, are inclined with respect to the normal direction of the display screen. That is, in the temporary region 70, the note icons are disposed to give a messy impression so that the user can intuitively recognize that it is during operation.

Also, in the vicinity of the first region 751 of the temporary region 70, a plurality of function icons, for example, a pen icon 771, a calendar icon 772, a scrap note icon 773, and a tag icon 774, are displayed.

The pen icon 771 is provided to instruct a transition to the note data generation function, and is displayed in a pen shape so that the handwriting input using the note data generation function can be intuitively recognized.

The calendar icon 772 is provided to instruct a transition to the timeline note function, and characters representing year, month, day, and day of the week are displayed in the icon.

The scrap note icon 773 is provided to instruct a transition to the scrap note function, and an image added to the scrap note data 60c by the scrap note function, or the like is displayed by a thumbnail.

The tag icon 774 is provided to instruct an execution of the tag function, and is displayed by a rectangle so as to represent a tag. In the example illustrated in FIG. 4, two tags of different colors are included in the tag icon 774.

Also, in the desktop/drawer screen, the function icon disposed in the vicinity of the first region 751 cannot be used. When transitioning from the desktop/drawer screen to the desktop note screen, the range, which includes the function icons disposed in the vicinity of the first region 751 and the first region 751 of the desktop/drawer screen, is expanded and displayed as the desktop note screen. The function icon may be used in the expanded display state in the desktop note screen.

Figure 5:
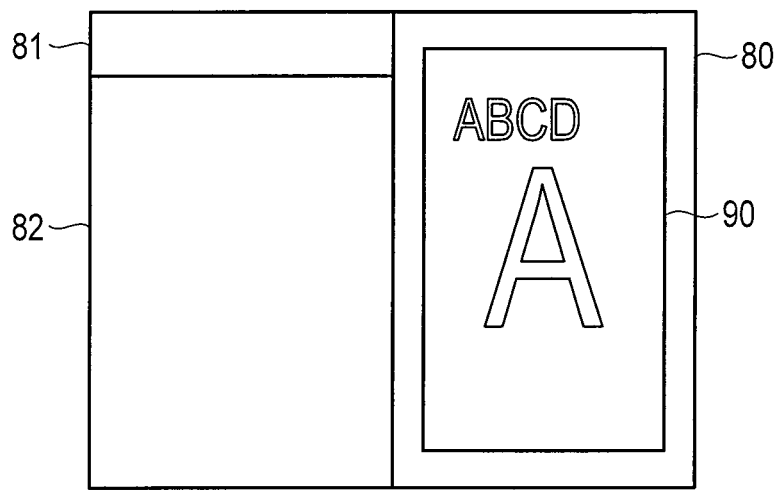
FIG. 5 is a diagram describing a display mode of a note icon displayed on the desktop/drawer screen of the embodiment.
Figure 6:
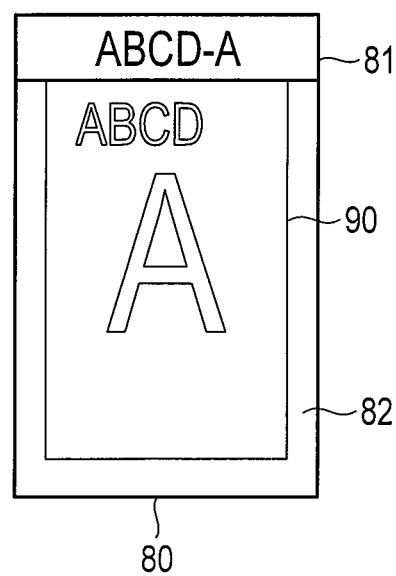
FIG. 6 is a diagram describing a display mode of a note icon displayed on the desktop/drawer screen of the embodiment.

FIGS. 5 and 6 are diagrams describing the display mode of the note icon displayed on the desktop/drawer screen.

In the embodiment, a figured note icon of a state in which a document (page) is bound to a real note (clear file) is used. FIG. 5 illustrates a state in which the note 80 is opened and the page 90 to be bound is exposed. FIG. 6 illustrates a state in which an outer sheet 82 of the note 80 is closed. Since the outer sheet 82 of the note 80 is transparent, FIG. 6 illustrates that the described contents of the bound first page (input handwriting or the like) are transparently shown. In an upper surface portion 81 of the outer sheet 82, identification information (document name or the like) for identifying the document (page) bound to the note 80 is described.

Since the contents of the bound page are displayed in the figured note icon of the note illustrated in FIG. 6, the user can easily identify the contents of the note file corresponding to the note icon. Also, by enabling the user to input identification information to the note icon by the handwriting input, the identification information may be displayed in the note icon, like the identification information described in the upper surface portion 81 of the outer sheet 82 illustrated in FIG. 6. In this manner, it is possible to identify not only the contents of the page but also the contents of the note file corresponding to the note icon by the identification information. Also, the identification information in the note icon is omitted in the following drawings.

Next, an example of a operation of arranging note icons in the desktop/drawer screen of the embodiment will be described.

FIG. 7 illustrates an example of the desktop/drawer screen in which a plurality of note icons are arranged in the temporary region 70 and the storage region 71. When the note data 60a is recorded by the note data generation function, the desktop/drawer display module 50a displays the note icons in the storage region 71 based on the note data 60a.

In FIG. 7, the desktop/drawer display module 50a displays four note icons 80A to 80D in the storage region 71. Also, the desktop/drawer display module 50a displays the note icon 801 in the first region 751 of the temporary region 70, the note icon 802 in the second region 752, and the note icon 805 in the fifth region 755.

In the desktop/drawer screen, the display position of the note icon may be moved by the touch operation by the pen 100 or finger. For example, when the note icon is pressed and held (more than a predetermined time has elapsed while keeping a touched state), the desktop/drawer display module 50a sets the note icon to a draggable state. For example, when the note icon 80A displayed in the storage region 71 illustrated in FIG. 7 is pressed and held and is dragged to the fourth region 754 of the temporary region 70 and then dropped (touch end), the desktop/drawer display module 50a displays the note icon 80A in the fourth region 754 of the temporary region 70.

Also, in a similar manner, when the note icon 802 disposed in the second region 752 of the temporary region 70 is dragged to the third region 753, the desktop/drawer display module 50a moves the note icon 802 to the position of the third region 753. Also, when the note icon 80D is dragged to the fifth region 755 in which the note icon 80D has already been displayed, the desktop/drawer display module 50a, as illustrated in FIG. 8, displays the note icon 80D in the fifth region 755 and displays the note icon 805 having been displayed in the fifth region 755 in the note icon region 784. That is, the desktop/drawer display module 50a exchanges the display positions of the note icon 805 and the note icon 80D.

In this manner, an arbitrary note icon from the storage region 71 may be disposed in the temporary region 70 by the drag operation. Also, the note icon may be disposed at an arbitrary position even within the temporary region 70. Therefore, the note icons may be disposed according to the user's preference. For example, a frequently used note icon (note file) may be disposed at a position at which the operation is facilitated.

Figure 9:
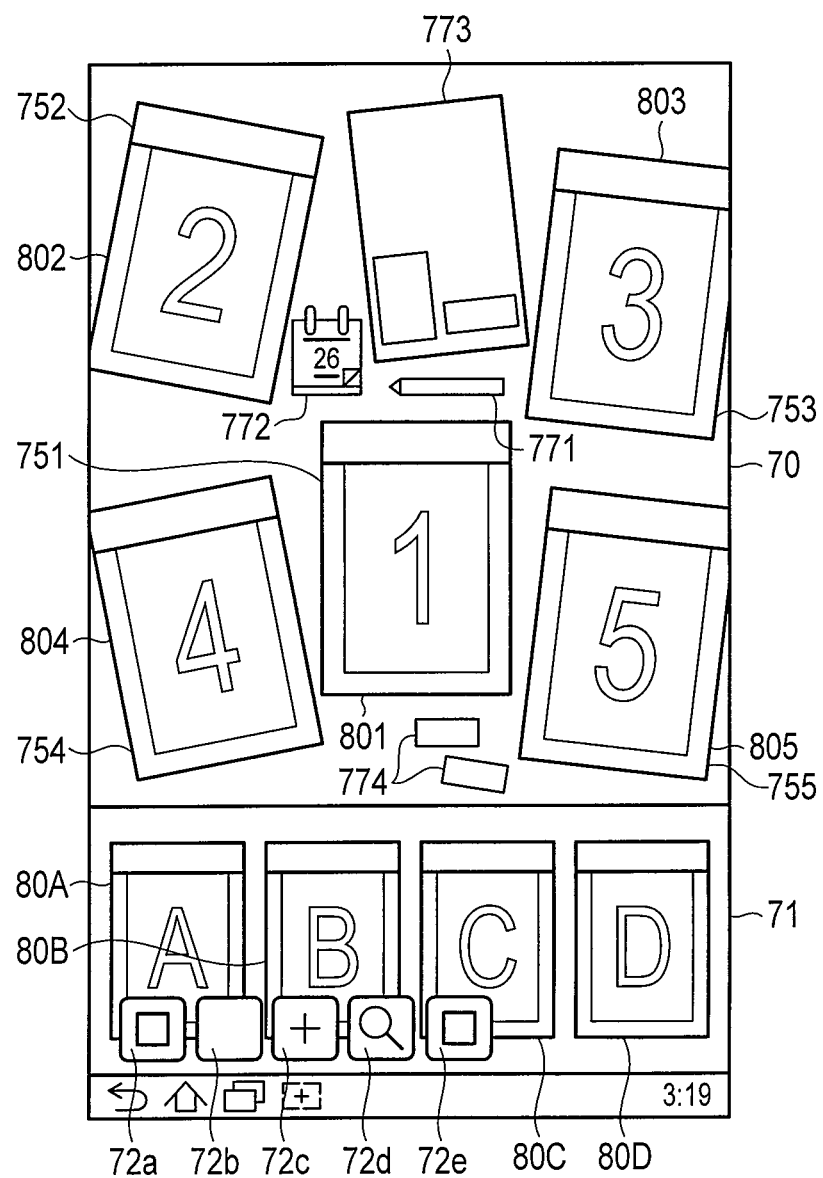
FIG. 9 is a diagram illustrating an example of the desktop/drawer screen of the embodiment.

FIG. 9 illustrates an example in which the note icons 801, 802, 803, 804 and 805 are disposed in the five regions 751, 752, 753, 754 and 755 of the temporary region 70, respectively.

Also, for example, the desktop/drawer display module 50a displays the four note icons 80A, 80B, 80C and 80D in the storage region 71 in new order of date and time displayed in the temporary region 70. Also, new order of date and time subjected to page edit may be used. Also, note icons may be disposed in descending order of number of times subjected to page edit.

Figure 10:
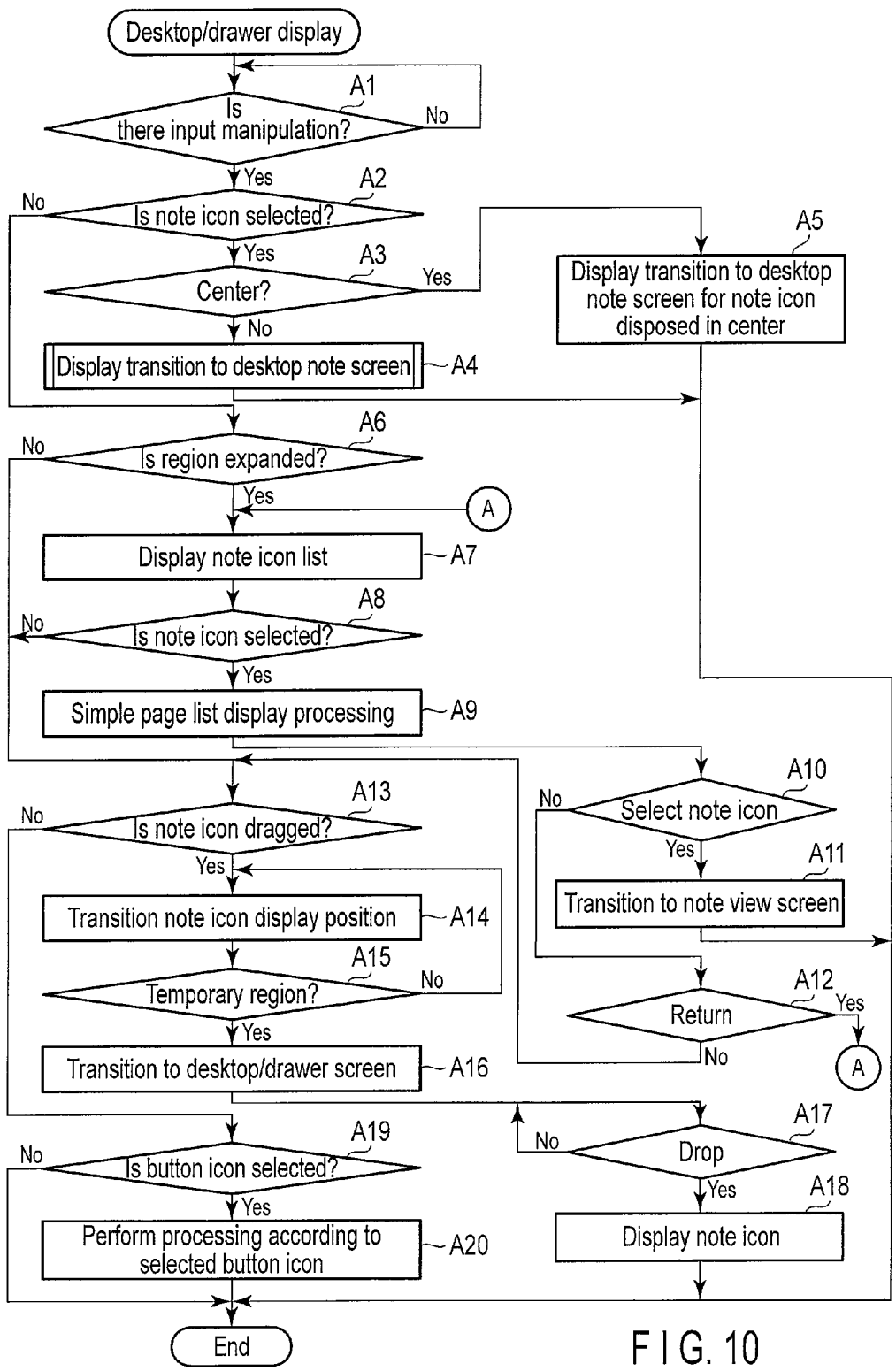
FIG. 10 is a flowchart illustrating display processing corresponding to an input operation on the desktop/drawer screen of the embodiment.

Next, display processing according to input operation on the desktop/drawer screen will be described with reference to a flowchart illustrated in FIG. 10.

By performing a gesture operation using the pen 100 or finger with respect to the desktop/drawer screen, the user can instruct a transition to other function or a screen switch. Examples of the gesture operation include a tap operation, a pinch-out/pinch-in operation, a swipe operation, a flick operation, and a drag operation.

When there is the input operation with respect to the touch screen display 17 on which the desktop/drawer screen is displayed (step A1, Yes), the input determination module 30 causes the display processing module 50 to perform display processing according to the input operation.

For example, in the vicinity of a boundary line between the storage region 71 and the temporary region 70, when there is an input operation of instructing an expansion of the storage region 71 by, for example, a vertical pinch-out operation or a drag operation of moving the boundary line in an upward direction (step A6, Yes), the desktop/drawer display module 50a expands the display range of the storage region 71 and displays a note icon list screen (drawer screen) displaying a list of note icons (step A7).

Figure 11:
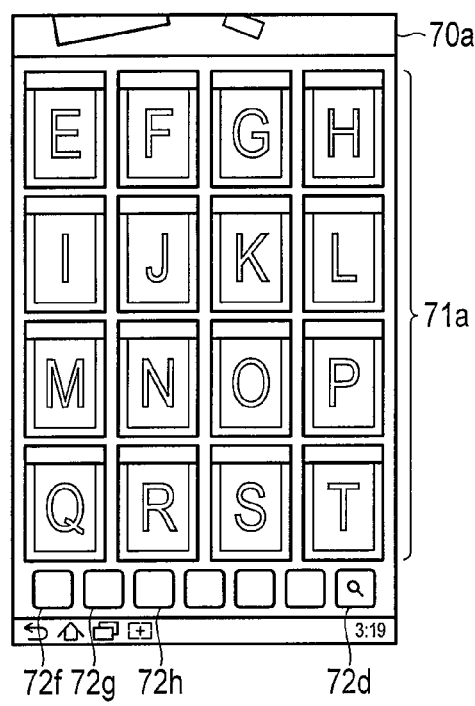
FIG. 11 is a diagram illustrating a display example of a note icon list screen of an embodiment.

FIG. 11 illustrates a display example of the note icon list screen (drawer screen). As illustrated in FIG. 11, in the note icon list screen, the temporary region 70a is reduced and the storage region 71a is expanded. In the storage region 71a, the note icons are disposed and displayed in a grid shape. Also, the desktop/drawer display module 50a displays a plurality of button icons 72*d*, 72*f*, 72*g* and 72*h* (context buttons) according to the note icon list screen (drawer screen).

When the temporary region 70*a* is swiped in the drawer screen, or when the pinch-in operation is performed in the storage region 71*a*, the desktop/drawer display module 50*a* reduces the storage region 71*a* and expands the temporary region 70*a*, such that the display is returned to the original desktop/drawer screen illustrated in FIG. 9.

For example, when a vertical swipe operation is performed in the storage region 71*a*, the desktop/drawer display module 50*a* scrolls the drawer screen in a vertical direction to display another note icon that cannot be displayed on one screen. Also, for example, when a horizontal swipe operation or flick operation is performed in the storage region 71 illustrated in FIG. 9, the desktop/drawer display module 50*a* scrolls the screen inside the storage region 71 to change to a display of another note icon.

In the note icon list screen (drawer screen) illustrated in FIG. 11, when the note icon is designated by a tap operation or the like in (step A8, Yes), the desktop/drawer display module 50*a* performs simple page list display processing by the simple page list display module 50*c*. The simple page list display module 50*c* displays the screen (simple page list display screen) deploying the page included in the note file corresponding to the note icon designated from the note icon list screen (step A9).

Figure 12:
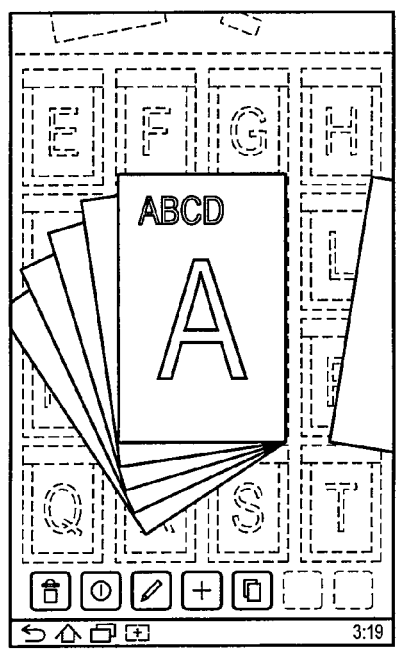
FIG. 12 is a diagram illustrating an example of a simple page list display screen of an embodiment.

FIG. 12 is a diagram illustrating an example of the simple page list display screen. As illustrated in FIG. 12, in the simple page list display screen, for example, the first page of the note file (the outline of the page is rectangular) is displayed in the center. Furthermore, when a plurality of pages is included in the note file, the respective pages are shifted and displayed such that parts of the pages are not overlapped with one another. By deploying and displaying the plurality of pages, the overview of the page configuration of the note file can be easily grasped. Also, all pages are not deployed, and pages of which the number exceeds a preset upper limit (for example, five pages) are not deployed.

In the simple page list display screen, a simple page edit function can be executed. For example, the simple page list display module 50*c* displays a plurality of button icons related to the page edit on the simple page list display screen. For example, the simple page edit function may execute not only a display switch (page up/down) according to the operation on the displayed page (see FIG. 22) but also a page deletion, a display of page information, a transition to a note view screen (note data generation function), a page insertion (addition), and a page copy/paste according to the operation of the button icons.

Also, when the page displayed by the display switch is tapped (step A10, Yes), the simple page list display module 50*c* transitions to the note view screen (note data generation function) where handwriting input is possible with respect to the note. Details of the note view screen (note data generation function) will be described below (step A11).

Also, when tapped in the range outside the page of the simple page list display screen (step A12, Yes), the simple page list display module 50*c* transitions to the note icon list screen (drawer screen) by the desktop/drawer display module 50*a* (step A7).

Also, in the note icon list screen (drawer screen), the note icon may be dragged and moved to the temporary region 70. When the note icon displayed in the storage region 71*a* is pressed and held, the desktop/drawer display module 50*a* sets the note icon to a draggable state, and changes the display position of the note icon according to the drag operation (steps A13 and A14).

Figure 13:
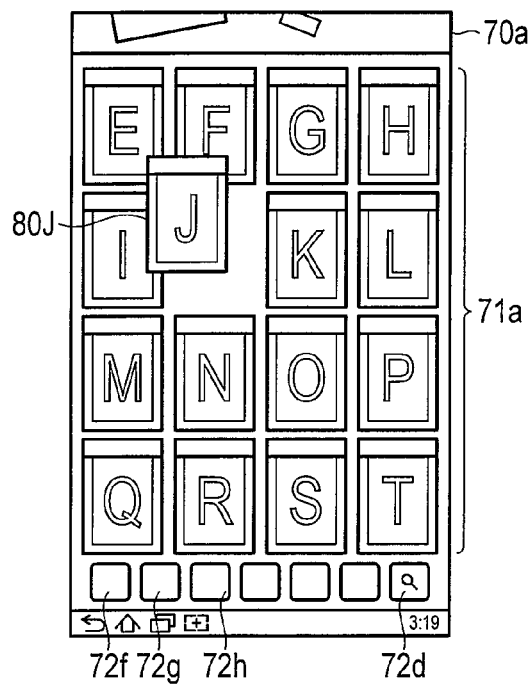
FIG. 13 is a diagram illustrating an example of a screen of an embodiment, in which a note icon is being dragged.

FIG. 13 is an example of a screen in which the note icon 80J displayed in the storage region 71*a* is being dragged.

When the note icon 80J is dragged to the temporary region 70*a* (step A15, Yes), the desktop/drawer display module 50*a* switches a display to the desktop/drawer screen (step A16) without changing the display position of the note icon 80J.

Figure 14:
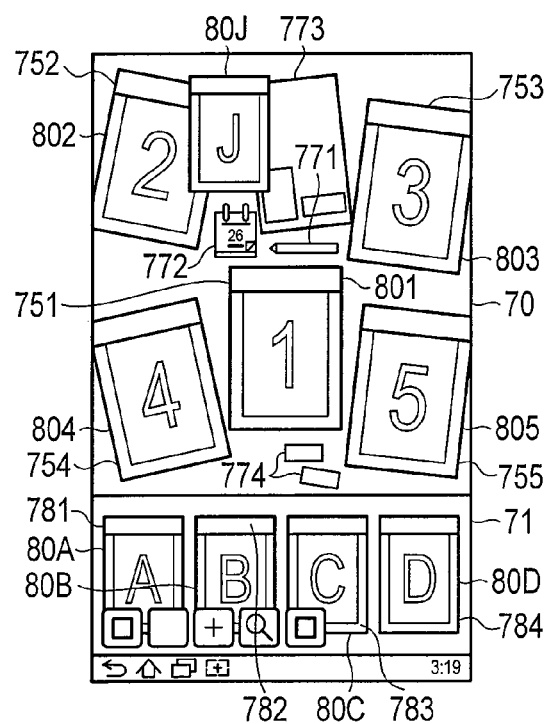
FIG. 14 is a diagram illustrating an example of the desktop/drawer screen of the embodiment, which is displayed in response to the drag of the note icon.

FIG. 14 is a diagram illustrating an example of the desktop/drawer screen displayed in response to the drag of the note icon 80J.

When the note icon 80J is dragged to any one region 751 to 755 of the temporary region 70 and then dropped (step A17, Yes), the desktop/drawer display module 50*a* displays the note icon 80J in a region of drag destination (step A18). Also, when dragged to any one of the note icon regions 781 to 784 of the storage region 71, the desktop/drawer display module 50*a* displays the note icon 80J in a certain note icon region of the drag destination.

Also, the desktop/drawer display module 50*a* displays the button icons 72*a*, 72*b*, 72*c*, 72*d* and 72*e* on the desktop/drawer screen as illustrated in FIGS. 4 and 9, and displays the button icons 72*d*, 72*f*, 72*g* and 72*h* on the note icon list screen (drawer screen) as illustrated in FIG. 11. When there is a operation of selecting the button icons 72*a*, 72*b*, 72*c*, 72*d*, 72*e*, 72*f*, 72*g* and 72*h*, for example, a operation of tapping the button icons (step A19, Yes), the desktop/drawer display module 50*a* performs processing according to the selected button icon (step A20).

For example, the button icon 72*a* is a button icon used to instruct a transition to the desktop note screen, the button icon 72*b* is a button icon used to instruct a transition to the note icon list screen (drawer screen), the button icon 72*c* is a button icon used to instruct an addition of a new note icon to the storage region 71, the button icon 72*d* is a button icon used to instruct an execution of the search function of the note file (page), and the button icon 72*e* is a button icon used to instruct a transition to the setting screen for setting various functions of the handwriting input program 202. Also, the button icon 72*f* is used to instruct a transition to the desktop/drawer screen, the button icon 72*g* is used to instruct an execution of the sort function of sorting note icons displayed in the storage regions 71*a* and 71, and the button icon 72*h* is used to instruct an execution of the filter function of specifying note icons displayed in the storage regions 71*a* and 71 by only the note icons corresponding to the condition.

Also, the desktop/drawer display module 50*a* may display relevant button icons other than the above-described functions. Also, when all the button icons cannot be displayed on one screen, the type of the button icons may be changed by scrolling the display of the button icons.

Next, the transition from the desktop/drawer screen to the desktop note screen will be described.

In the desktop/drawer screen illustrated in FIG. 9, when the note icon is selected by the tap operation (step A2, Yes), the desktop/drawer display module 50*a* transitions to the desktop note screen for page edit with respect to the note file corresponding to the selected note icon.

When a note icon other than the note icon 801 of the first region 751 disposed in the center of the temporary region 70 is selected by tapping (step A3, Yes), the desktop/drawer display module 50*a* displays a transition image (including an animation) that transitions the selected note icon in a form (desktop note screen) that can manipulate the page of the note file (step A4).

Figure 15:
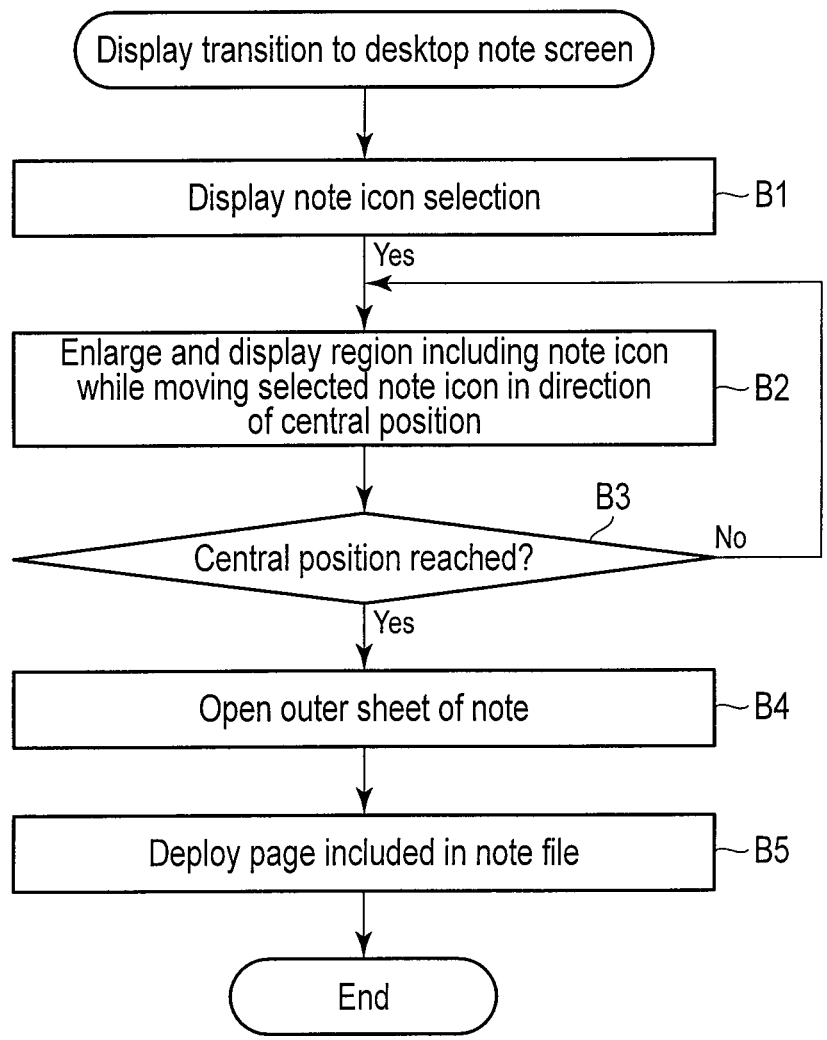
FIG. 15 is a flowchart illustrating a transition display from a desktop/drawer screen to a desktop note screen in an embodiment.
Figure 16:
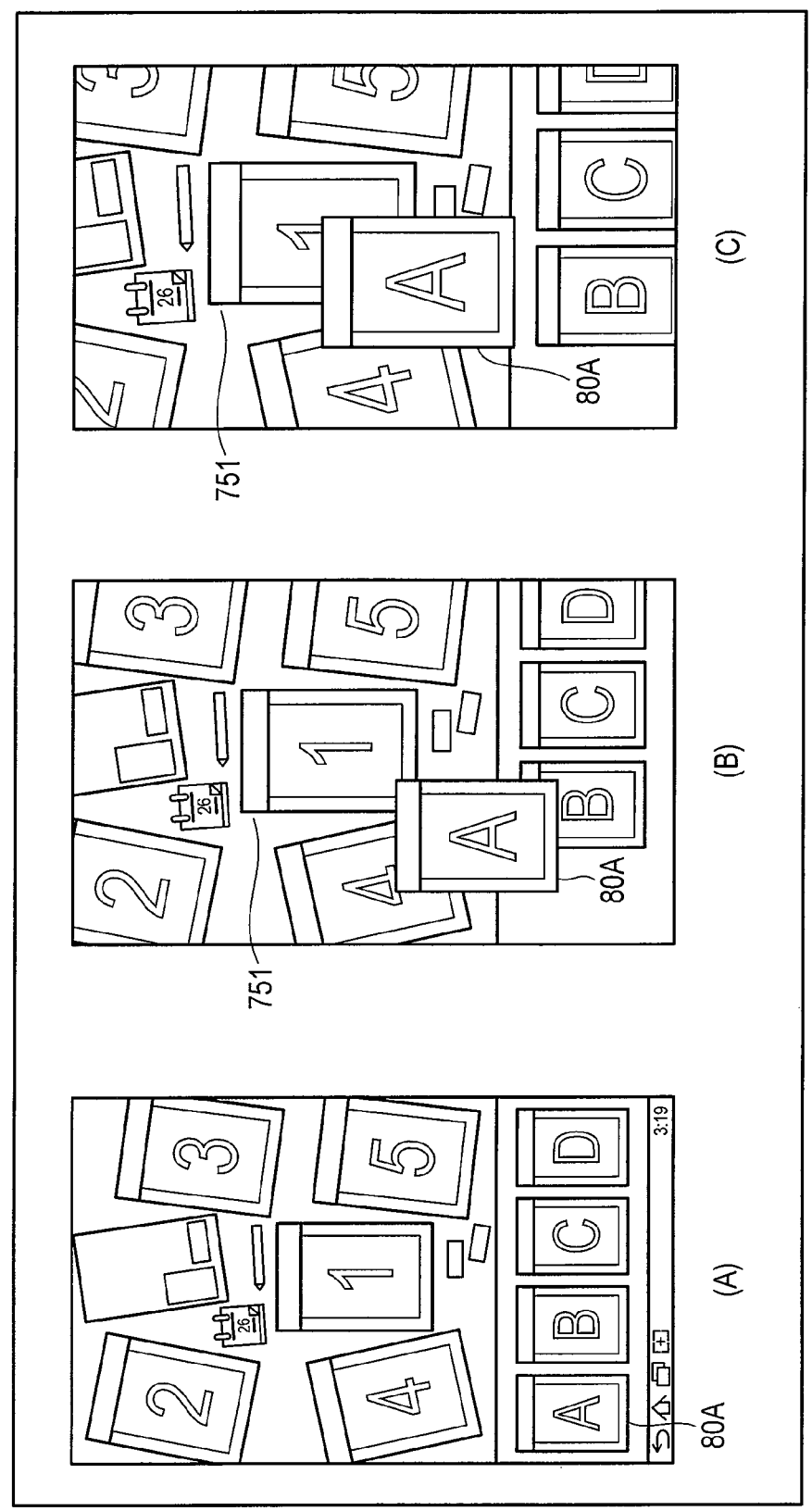
FIG. 16 is a diagram illustrating an example of a transition image during a transition from the desktop/drawer screen to the desktop note screen in the embodiment.
Figure 17:
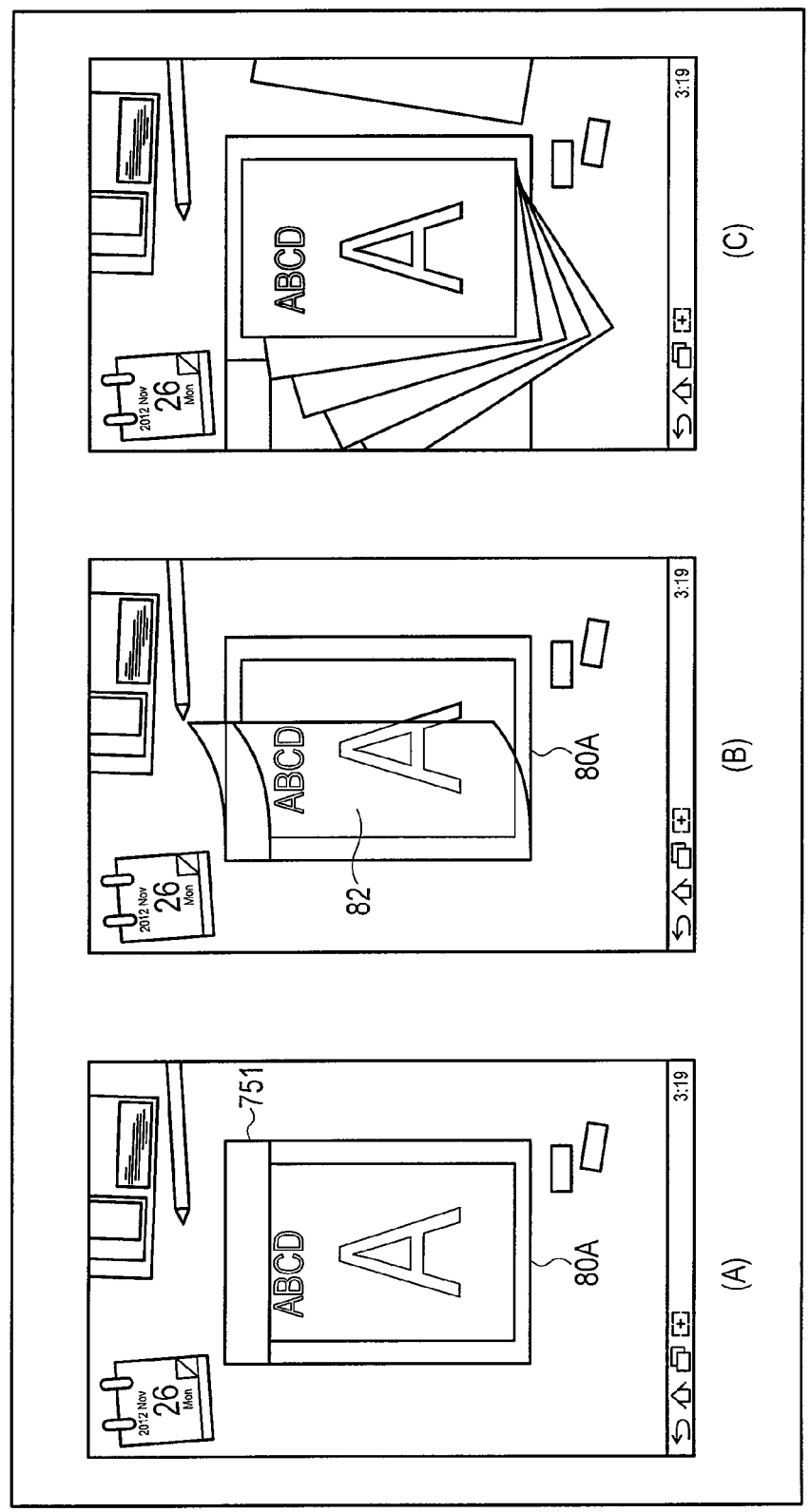
FIG. 17 is a diagram illustrating an example of a transition image during a transition from the desktop/drawer screen to the desktop note screen in the embodiment.

FIG. 15 is a flowchart illustrating a transition display from the desktop/drawer screen to the desktop note screen in an embodiment. (A), (B), (c) of FIG. 16 and (A), (B), (c) of FIG. 17 illustrate an example of the transition image during the transition from the desktop/drawer screen to the desktop note screen. Any image may be used as the transition image, as long as the image is an image being displayed during the transition from the desktop/drawer screen to the desktop note screen, or during the transition from the desktop note screen to the desktop/drawer screen. In the desktop/drawer screen, the display mode of the note icon is a mode that can select at least one or more note icons. In the desktop note screen, the display mode of the note icon is a mode that can manipulate the page of the corresponding note file.

First, the desktop/drawer display module 50*a* changes the display mode of the note icon selected by the tap operation or the like (step B1). For example, when the note icon 80A illustrated in (A) of FIG. 16 is selected, the desktop/drawer display module 50*a* slightly enlarges the note icon 80A at the same position. Subsequently, as illustrated in (B) and (C) FIG. 16, the desktop/drawer display module 50*a* moves the note icon 80A in a direction of the first region 751. Also, the desktop/drawer display module 50*a* expands and displays the desktop/drawer screen in the vicinity of the note icon 80A, including the note icon 80A, according to the movement of the note icon 80A (step B2). That is, the desktop/drawer display module 50*a* displays the transition image (including an animation) that expands and displays the vicinity of the first region 751, while moving the note icon 80A to the first region 751 (center direction). In the vicinity of the first region 751, objects such as the pen icon 771, the calendar icon 772, the scrap note icon 773, and the tag icon 774 are disposed. The transition image that expands and displays the vicinity of the first region 751 includes images of the above-described objects.

As illustrated in (A) of FIG. 17, when the note icon 80A is moved to the first region 751 (center position) (step B3, Yes), the desktop/drawer display module 50*a* displays the transition image that changes the display mode of the note icon, as illustrated in (B) of FIG. 17, so as to show the opening of the outer sheet 82 of the note 80 described with reference to FIG. 6 (step B4). That is, in order to set the note file to an editable state, the transition image allowing the user to recognize the opening of the note file (note) is displayed.

When displaying the opening of the note file is completed, the desktop/drawer display module 50*a* displays the transition screen deploying the page included in the note file by the desktop note display module 50*b* (step B5). For example, the desktop note display module 50*b* displays the first page of the note file (outline of the page is rectangular) in the center. Furthermore, when a plurality of pages is included in the note file, the respective pages are shifted and displayed such that parts of the pages are not overlapped with one another. By deploying and displaying the plurality of pages, the overview of the page configuration of the note file can be easily grasped. Also, all pages are not deployed, and pages of which the number exceeds a preset upper limit (for example, five pages) are not deployed. (C) of FIG. 17 illustrates a state in which a plurality of pages included in the note file corresponding to the note icon 80A (at least a part of images corresponding to the plurality of pages) in the first region 751 is deployed. In this manner, the transition from the desktop/drawer screen to the desktop note screen is completed.

Therefore, when the note icon is selected by the touch operation (tap) in the desktop/drawer screen, the transition image (including an animation) that transitions the note icon to the screen that deploys the page included in the note file is displayed. Therefore, the user can intuitively recognize that the page within the note file has transitioned to the manipulable state.

Also, when the note icon 801 disposed in the first region 751 illustrated in FIG. 9 is selected (tapped) (step A3, Yes), the desktop/drawer display module 50*a* displays the transition image for the note icon disposed in the center (first region 751) because the note icon need not be moved in the direction of the first region 751 (step A5). That is, the desktop/drawer display module 50*a* displays the transition image that enlarges and displays the note icon 801 disposed in the first region 751 in the desktop/drawer screen, and the vicinity of the note icon 801, transitions to the display screen illustrated in (A) of FIG. 17, and then, transitions to the image as illustrated in (B) and (C) of FIG. 17. In this manner, the desktop/drawer display module 50*a* transitions to the desktop note screen.

Figure 18:
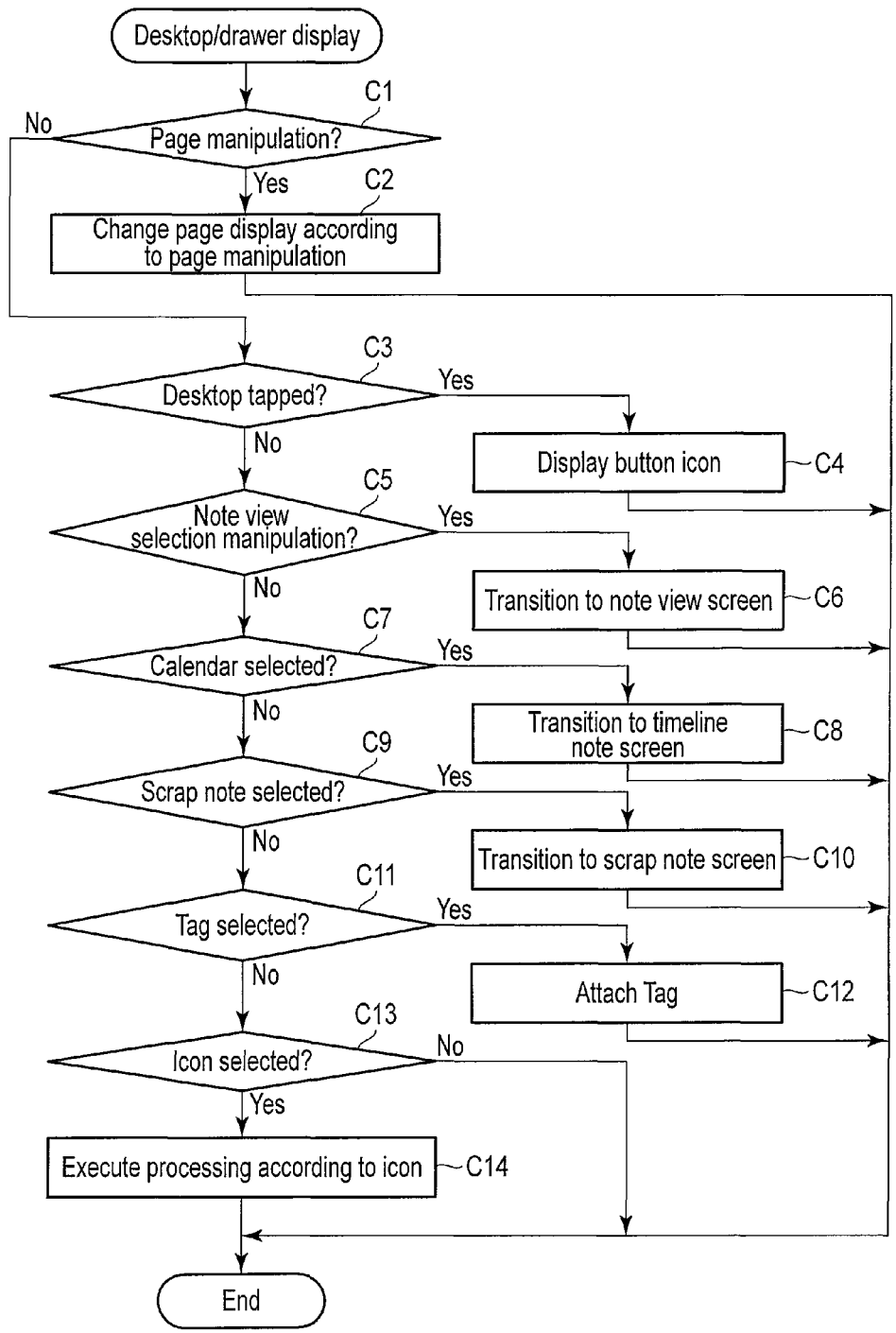
FIG. 18 is a flowchart illustrating display processing corresponding to an input operation on the desktop note screen of the embodiment.
Figure 19:
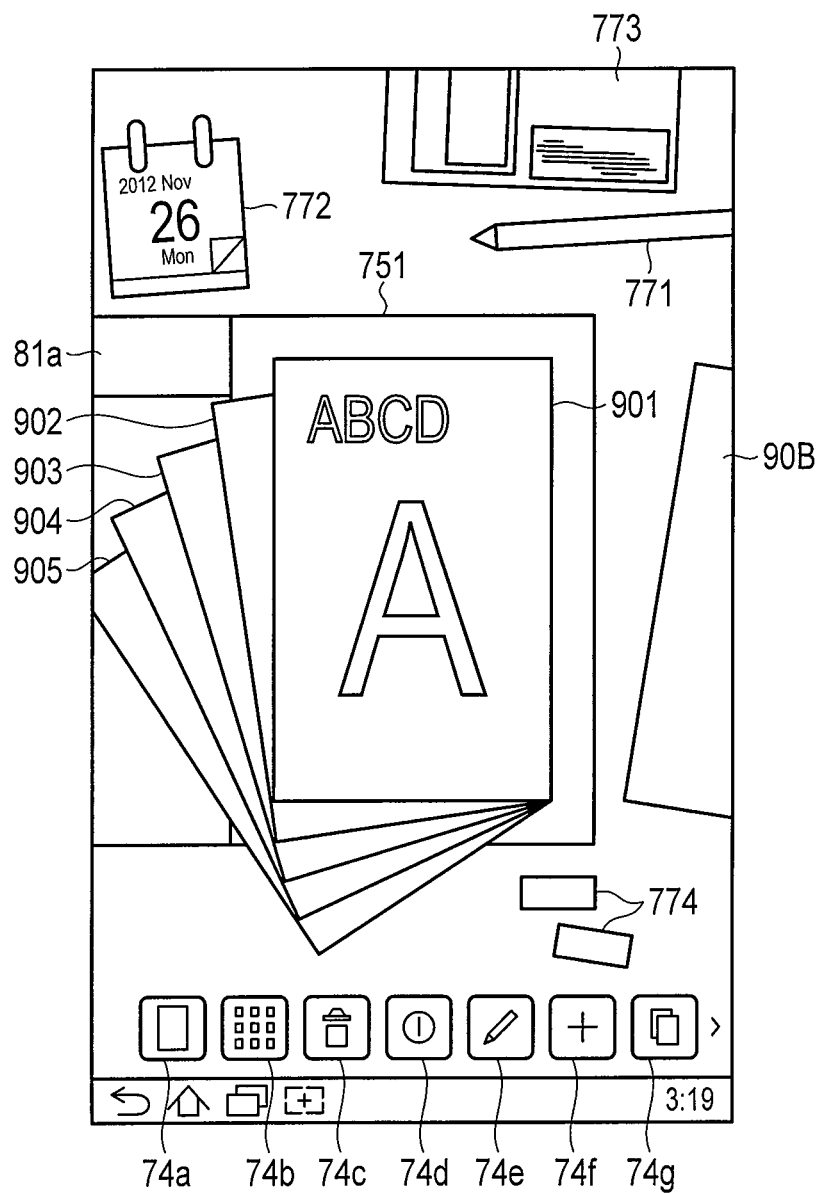
FIG. 19 is a diagram illustrating a display example of the desktop note screen of the embodiment.

Next, display processing according to input operation on the desktop note screen will be described with reference to a flowchart illustrated in FIG. 18. FIG. 19 illustrates a display example of the desktop note screen.

By performing a gesture operation using the pen 100 or finger with respect to the desktop note screen, the user can instruct a transition to other function or a screen switch. Examples of the gesture operation include a tap operation, a pinch-out/pinch-in operation, a swipe operation, a flick operation, and a drag operation.

At the time of the transition of the desktop note screen, the desktop note display module 50*b* may always display the first page and may also display the page displayed at last in the previous desktop note screen. In the desktop note screen illustrated in FIG. 19, the desktop note display module 50*b*, for example, displays a page 901 included in the note file, and displays a plurality of pages 902, 903, 904 and 905 while being shifted from the page 901. Also, on the right side of the page 901, a paged-up/down page 90B is displayed. Also, the desktop note display module 50*b* displays, for example, the pen icon 771, the calendar icon 772, the scrap note icon 773, and the tag icon 774 in the vicinity of the note file (first region 751).

When the region (desktop) where nothing is displayed in the desktop note screen is tapped (step C3, Yes), the desktop note display module 50*b* displays a plurality of button icons 74*a*, 74*b*, 74*c*, 74*d*, 74*e*, 74*f* and 74*g* as illustrated in FIG. 19 (step C4).

When there is a operation of selecting the button icons 74*a*, 74*b*, 74*c*, 74*d*, 74*e*, 74*f* and 74*g*, for example, a operation of tapping the button icons (step C13, Yes), the desktop note display module 50*b* performs processing according to the selected button icon (step C14).

For example, the button icon 74*a* is used to instruct a transition to the desktop/drawer screen, the button icon 74*b* is used to instruct a transition to the page list screen (grid display screen), the button icon 74*c* is used to instruct a deletion of the page displayed in the desktop note screen, the button icon 74*d* is used to instruct a display of page information, the page icon 74*e* is used to instruct a transition to the note view screen (note data generation function), the button icon 74*f* is used to instruct an addition of page, and the button icon 74*g* is used to instruct an execution of page copy.

Also, when all the button icons cannot be displayed on one screen, the type of the button icons may be changed by scrolling the display of the button icons. For example, except for the button icons illustrated in FIG. 19, there is a button icon for transition to the tag function.

Figure 20:
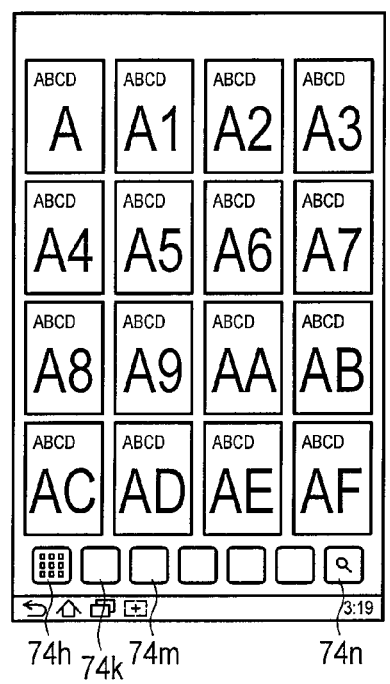
FIG. 20 is a diagram illustrating an example of a page list screen of an embodiment.

FIG. 20 is a diagram illustrating an example of the page list screen (grid display screen) displayed according to the tap of the button icon 74b. The desktop note display module 50b arranges and displays all pages included in the note file in a grid shape. In a case where all pages cannot be displayed on one screen, for example, when a vertical swipe operation is performed on the page list screen, the desktop note display module 50b scrolls the page list screen in a vertical direction to display other page that cannot be displayed on one screen.

Also, the desktop note display module 50b displays a plurality of button icons 74h, 74k, 74m and 74n (context buttons) according to the page list screen.

Also, the button icon 74h is used to instruct a transition to the desktop note screen (grid display release), the button icon 74k is used to instruct an execution of the sort function of sorting the pages displayed on the page list screen, the button icon 74m is used to instruct an execution of the filter function of specifying the pages displayed on the page list screen by only the note icon corresponding to the condition, and the button icons 74n is used to instruct an execution of the search function of searching the pages. Also, when the pinch-in operation is performed on the page list screen, the desktop note display module 50b releases the grid display and returns to the desktop note screen, as in the case where the button icon 74h is tapped.

Figure 21:
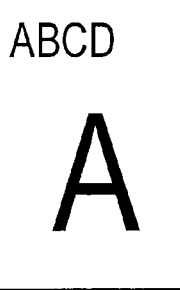
FIG. 21 is a diagram illustrating an example of a page information display screen of an embodiment.

FIG. 21 is a diagram illustrating an example of the page information display screen (property screen) displayed according to the tap of the button icon 74d of FIG. 19. The note property display module 50e searches the page information of the page displayed on the top of the desktop note screen from the note data 60a, and displays the searched page information together with the page thumbnail. As illustrated in FIG. 21, examples of the page information include generated date and time, updated date and time, accessed date and time, presence or absence (type) of tag, file lock, template type, and paper setup.

Also, when there is an input operation (page operation) with respect to the page (step C1, Yes) in the desktop note screen, the desktop note display module 50b changes the page display according to the page operation (step C2). When changing the page display, the desktop note display module 50b displays the movement of the page by a transition image (including an animation).

Figure 22:
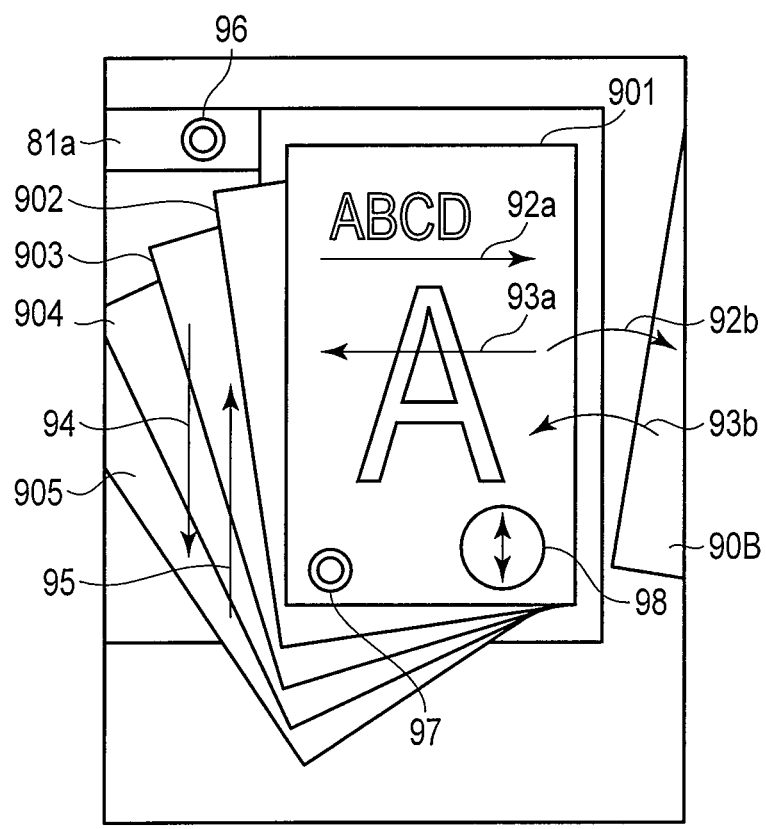
FIG. 22 is a diagram illustrating an example of a page operation of an embodiment.

FIG. 22 is a diagram illustrating an example of the page operation.

For example, when there is a swipe operation (or flick operation) 92a from left to right with respect to the page 901 displayed in the center, or when there is a swipe operation (or flick operation) 92b from the page 901 to the page 90B, the desktop note display module 50b pages up/down the page 901 to move to the position of the page 90B, newly displays the page 902 in the center, and changes the other pages 903 to 905 to the positions shifted in the central direction. By this page operation, the page may be sent forward (riffled) at each page.

When there is a swipe operation (or flick operation) 93a from right to left with respect to the page 901 displayed in the center, or when there is a swipe operation (or flick operation) 93b from the page 90B to the page 901, the desktop note display module 50b moves the page riffled to the position of the page 90B to the central position, and changes the other pages to the positions moved rearward. By this page operation, the page may be returned at each page.

When there is a swipe operation (or flick operation) 94 from top to bottom in the leftward region as compared with the central page 901, the desktop note display module 50b sends forward all the other pages at each page until the last page included in the note file is displayed in the center. In this manner, even when a plurality of pages is included in the note file, the last page may be simply displayed.

When there is a swipe operation (or flick operation) 95 from bottom to top in the leftward region as compared with the central page 901, the desktop note display module 50b returns all the pages sent forward at each page until the first page included in the note file is displayed in the center. In this manner, even when a plurality of pages is sent forward, the first page may be simply displayed.

Also, although the direction of the swipe operations 94 and 95 is assumed as a vertical direction in FIG. 22, it may be an inclined direction. Also, although the page up/down is performed to the last page or the first page by the swipe operations 94 and 95, the number of the pages subjected to page up/down may be varied according to a distance on the screen where the swipe operation has been performed. Also, when the flick operation is performed, the number of the pages subjected to page up/down may be varied according to the intensity of the operation.

When there is a tap operation 96 in an upper left region 81a of the central page 901, the desktop note display module 50b transitions the desktop note screen to the desktop/drawer screen. That is, the desktop note display module 50b transitions the transition image, which has been described with reference to (A), (B), (C) of FIG. 16 and (A), (B), (C) of FIG. 17, in an opposite direction. In this manner, the user can intuitively recognize the completion of the page operation with respect to the note file.

When a pinch-out operation 98 is performed on the central page 901, the desktop note display module 50b transitions to the page list screen (grid display screen) illustrated in FIG. 20, and arranges and displays all pages included in the note file in a grid shape. Therefore, the pinch-in operation and the pinch-out operation may simply switch the desktop note screen illustrated in FIG. 19 and the page list screen (grid display screen) illustrated in FIG. 20.

As illustrated in FIG. 22, when the tap operation 97 is performed on the central page 901 (step C5, Yes), the desktop note display module 50b displays the note view screen (note data generation function) by the desktop note display module 50b (step C6). Also, even when the tap operation to the page icon 74e of FIG. 19 is performed, the desktop note display module 50b transitions to the note view screen (step C6).

FIG. 23 is a diagram illustrating an example of the note view screen. The note view screen is a screen for generating or editing the handwritten document (page) by the handwriting input operation using the pen 100.

When the stroke data having already been input by the handwriting is included in the page 901 displayed in the center of the desktop note screen, the note view display module 50d displays the page based on the completely input stroke data in the initial note view screen. Also, FIG. 23 illustrates an example of the note view screen generating a new page.

The note view display module 50d provides various tools for input of stroke data on the note view screen (pen input mode). For example, in the note view screen illustrated in FIG. 23, a black-pen button 501, a red-pen button 502, a marker button 503, a select button 504, and an eraser button 505 are displayed in an upper portion of the screen.

For example, when the black-pen button 501 is selected (tapped) and the handwriting is input using the pen 100, the note view display module 50d displays the black stroke (locus) on the note view screen according to the movement of the pen 100. Also, the note data generation module 40a generates page data based on the stroke data input through the note view screen.

Also, when the select button 504 is selected, the note view display module 50d selects a range in the note view screen according to a drag operation using the pen 100 or finger. For example, when dragged from an upper left vertex to a position of a lower right vertex representing a rectangular frame, the range is selected by the rectangular frame of a size designated by the drag operation. The stroke included in the range-selected region may be expanded/reduced by a pinch operation, be moved by a drag operation, and be deleted by a drag to a delete button.

When a tap operation using a finger other than a button is performed in the note view screen illustrated in FIG. 23, the note view display module 50d displays a page view screen of a menu display mode.

FIG. 24 illustrates an example of the page view screen of the menu display mode. The note view display module 50d transitions a plurality of buttons displayed in an upper portion of the note view screen to a pen menu including a plurality of pen-shaped icons 511, 512, 513, 514 and 515 as illustrated in FIG. 24, and displays a plurality of button icons 516 related to a page state in an lower portion of the note view screen. The button icon 516 may be switched to other button icons according to a horizontal flick operation.

Also, when a tap operation using a finger other than a button is performed in the page view screen of the menu display mode, the note view display module 50d returns to the page view screen of the pen input mode.

The note data generation module 40a generates page data in page units, based on the stroke data input through the note view screen by using various tools.

Also, for example, when a horizontal flick operation is performed in the page view screen, the note view display module 50d switches the edit target to the before or after page included in the note file. Also, when there is a operation of instructing an end (return) of the note view screen display, the display processing module 50 transitions to the desktop note screen by the desktop note display module 50b.

Next, when the calendar icon 772 of the desktop note screen is tapped (step C7, Yes), the desktop note display module 50b transitions to the timeline note screen by the timeline note display module 50f (step C8).

FIG. 25 is a diagram illustrating an example of the timeline note screen.

The timeline note screen is a screen for generating timeline data 60b by associating page data and temporary data with each other. In the timeline note screen illustrated in FIG. 25, an icon 520 representing year, month and day, which is the same as the calendar icon 772, is displayed. In the timeline note screen, like the typical page included in the note file, the stroke data 521 may be input by the handwriting input operation using the pen 100. Based on the stroke data input through the timeline note screen, the timeline data generation module 40b generates the timeline data 60b by associating the page data and the temporary data with each other, and records the generated timeline data 60b in the recording device 106.

Next, when the scrap note icon 773 of the desktop note screen is tapped (step C9, Yes), the desktop note display module 50b transitions to the scrap note screen by the scrap note display module 50g (step C10).

(A) and (B) of FIG. 26 are diagrams illustrating an example of the scrap note screen. The scrap note display module 50g displays the scrap note screen based on the scrap note data 60c recorded in the recording device 106.

Also, the scrap note data generation module 40c generates scrap note data 60c according to the user operation, separately from the execution of the note data generation function. The scrap note data generation module 40c cooperates with the application program 203 which is different from the handwriting input program 202, and generates the scrap note data 60c based on the image clipped from the entire screen or the partial screen displayed by the application program 203 through the scrap note display module 50g. Examples of other application programs 203 include a browser program, an image editing program, and a word processing program. The scrap note data generation module 40c forms a thumbnail image corresponding to the clipped screen, and generates the scrap note data 60c (scrap note screen) disposed in time series in order of clips according to the page shape as illustrated in (A) of FIG. 26.

Also, the scrap note data generation module 40c may receive the handwriting input with respect to the clipped image, and add the stroke data input by handwriting using the pen 100 to the image.

When a certain thumbnail is tapped in the scrap note screen, the scrap note display module 50g expands and displays the thumbnail (displays in a full size). For example, when the tap operation 531 is performed on the thumbnail 530 illustrated in (A) of FIG. 26, the scrap note display module 50g displays the original image 532 corresponding to the thumbnail 530 in a full size as illustrated in (B) of FIG. 26. In the image 532 displayed in a full size, the user can check the contents of the clipped image and the handwritten stroke with respect to the image. In (B) of FIG. 26, for example, a rectangular frame is handwritten in a noteworthy portion of the image, and characters calling attention, "POINT2", are handwritten.

When there is a tap operation in regions other than the image 532 within the screen illustrated in (B) of FIG. 26, or the button icon (return button), the scrap note display module 50g returns to the display of the scrap note screen illustrated in (A) of FIG. 26.

Also, in the note view screen, the scrap note screen as illustrated in (A) of FIG. 26 may be displayed according to the user operation (selection of the button icons or the like). When a certain thumbnail is selected from the scrap note screen, the note data generation module 40a imports the image corresponding to the selected thumbnail to the page that is being edited. In this manner, a plurality of images accumulated in the scrap note may be simply used for generation of note data.

Next, when the tag icon 774 of the desktop note screen is tapped (step C11, Yes), the tag processing screen display module 50n displays an image that attaches the tag to the page 901 displayed in the center (step C12). For example, the tag icon 774 includes two tags of different colors. The tag icon 774 is displayed as if the selected tag is attached to a predetermined position of the page 901, for example, an upper left portion. When the tag is attached to the page, the note data generation module 40a records the attribute data of the corresponding page. Also, for example, when the tag attached to the note is swiped (or flicked) upward from the position where the tag is displayed, the tag is peeled from the page (the tag image is deleted).

Also, it is possible to transition to the tag function by the selection of the button icon displayed on the note view screen. (A), (B), (C) of FIG. 27 illustrates an example of a sub-menu display screen when the button icon 540 for instructing the transition to the tag function is tapped.

Figure 27:
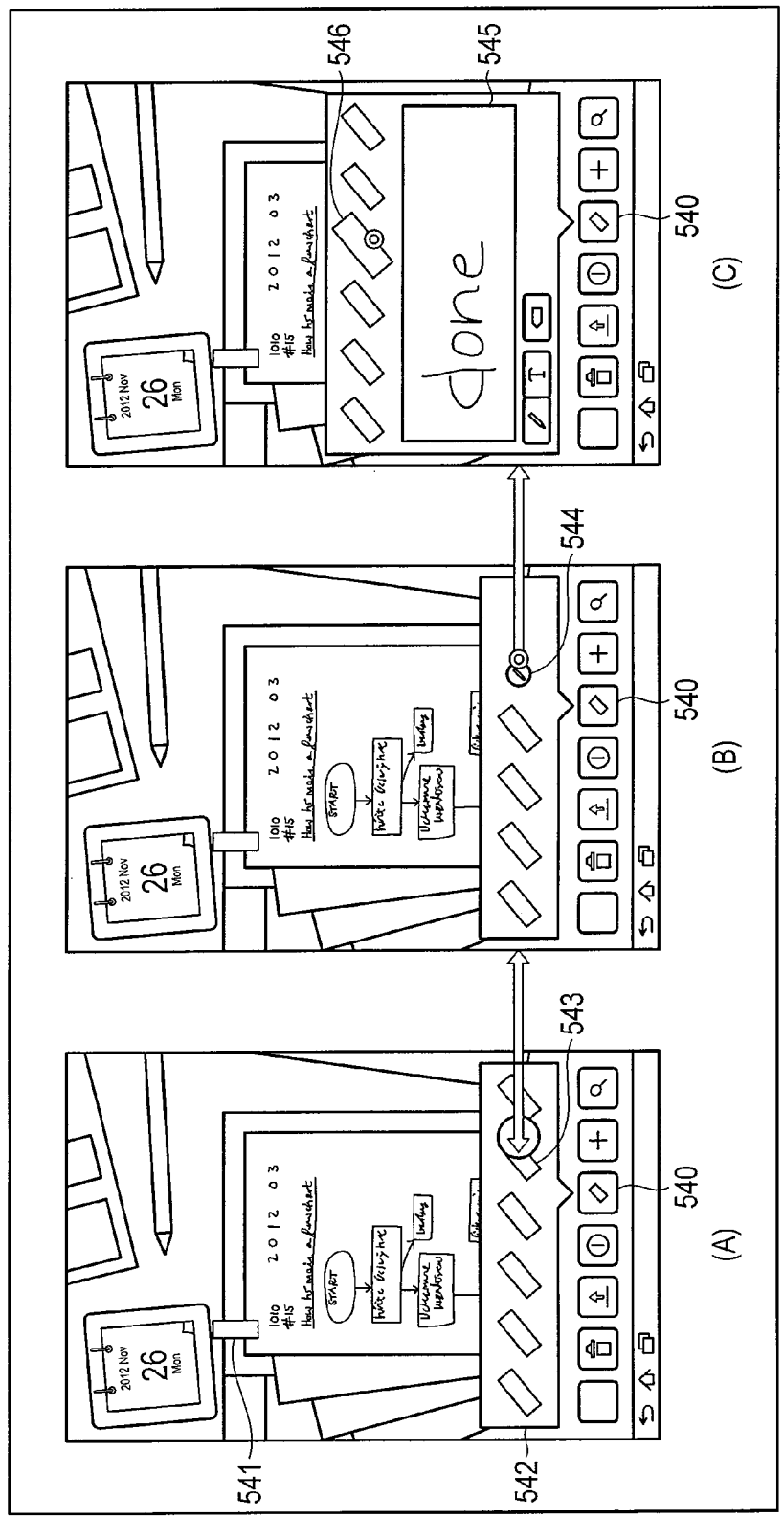
FIG. 27 is a diagram illustrating an example of a submenu display screen of an embodiment.

When the button icon 540 is tapped, the tag processing screen display module 50n displays a sub-menu 542 illustrated in (A) of FIG. 27. In the sub-menu 542, a plurality of types of tags each having a different color is listed. When the tag is tapped from the sub-menu 542, the tag processing screen display module 50n attaches the tapped tag 541 to the page as illustrated in (A) of FIG. 27. At this time, the tag processing screen display module 50n may display, by the transition image (including an animation), the state that the tag in the sub-menu 542 is moved to the attaching position of the page.

Also, when the (swipe or flick) operation of peeling the tag 541 attached to the page is performed, the tag processing screen display module 50n may display, by the transition image (including an animation), the state that the tag 541 is returned to the sub-menu 542.

When the sub-menu 542 is swiped (or flicked) in a horizontal direction, the tag processing screen display module 50n scrolls the tag displayed in the sub-menu 542 to change to the display of other tag that is not displayed on one screen. (B) of FIG. 27 illustrates an example of the sub-menu 542 displayed when swiped in a left direction in the sub-menu 542 illustrated in (A) of FIG. 27.

Also, as illustrated in (B) Of FIG. 27, in addition to the plurality of tags, a tag input button 544 for instructing a transition to a input screen for inputting characters to the tag is included in the sub-menu 542.

When the tag input button 544 is tapped, the tag processing screen display module 50n displays an input area 545 together with the tag list display as illustrated in (C) of FIG. 27. When a certain tag 546 is selected from the tag list display by tapping, the tag processing screen display module 50n changes the display color of the input area 545 to the color of the selected tag 546.

In the input area 545, handwriting input using the pen 100, or character input by a text mode (for example, input using a software keyboard) is possible. The tag data generation module 40d generates the tag data 60d based on the stroke data input through the tag processing screen (input area 545), and records the generated tag data 60d.

(C) of FIG. 27 illustrates an example in which characters (stroke data) of "done" is input to the input area 545 by using the pen 100. The tag processing screen display module 50n displays the characters input to the input area 545 on the tag 546. The tag processing screen display module 50n displays the characters input to the tag 546 as it is, even after the tag 546 is attached to the page. Therefore, the user can identify the tag by the characters displayed in the tag, as well as the tag attached to the page.

Also, it has been described above that the tag is attached to the predetermined position of the page, but the tag may also be attached to a position designated by the user. For example, the tag processing screen display module 50n enables the tag to be dragged from the sub-menu 542 to an arbitrary position on the page 901 and displays the tag at a drop destination position. In this manner, the tag may be displayed at a noteworthy position of the page.

For example, when a region other than the sub-menu 542 is tapped, the tag processing screen display module 50n ends the display of the sub-menu 542. Therefore, the screen is returned to the desktop note screen.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Also, the processing described in the above-mentioned embodiments is a program that can be executed by a computer, and may be provided to various devices by being recorded in a recording medium such as magnetic disk (flexible disk, hard disk, or the like), an optical disk (CD-ROM, DVD, or the like), and a semiconductor memory. Furthermore, the processing can also be provided to various apparatuses by being transmitted by a communication medium. The computer performs the above-described processing by reading the program recorded in the recording medium, or receiving the program through the communication medium, and controlling the operations by the program.

What is claimed is:

1. An electronic device comprising:
   a touch screen;
   a memory that stores a first note file and a second note file, wherein the first note file comprises pages comprising handwriting and the second note file comprise pages comprising handwriting; and
   a hardware processor configured to:
      display a first thumbnail indicative of the first note file at a first position on the touch screen and a second thumbnail indicative of the second note file at a second position on the touch screen wherein the first thumbnail comprises a first reduced image of a first page of the first note file and the second thumbnail comprises a second reduced image of a second page of the second note file;
      select the first thumbnail to open the first note file or the second thumbnail to open the second note file;
      display, when the first thumbnail is selected, a first animation indicative of a movement of the first thumbnail from the first position to a third position on the touch screen display, the third position being closer to a center of the touch screen than the first position and indicative of an enlargement of the first thumbnail, and display the first page of the first note file in an editable manner by handwriting;
      modify, after the first page of the first note file is edited, the first thumbnail by changing the first reduced image to a third reduced image of an edited first page of the first note file and display a modified first thumbnail at the first position on the touch screen;
      display, when the second thumbnail is selected, a second animation indicative of a movement of the second thumbnail from the first position to the third position on the touch screen display, display a fourth animation indicative of an enlargement of the second thumbnail at the third position on the touch screen, and display the second page of the second note file in an editable manner by handwriting;
      modify, after the second page of the second note file is edited, the second thumbnail by changing the second reduced image to a fourth reduced image of an edited second page of the second note file and display a modified second thumbnail at the second position on the touch screen.

2. The electronic device of claim 1, wherein the first thumbnail comprises a first icon to open the first note file and the second thumbnail comprises a second icon to open the first note file.

3. The electronic device of claim 1, wherein the hardware processor is further configured to:
display, when the first note file is closed, a third animation indicative of a reduction of at least one page of the first note file, the at least one page of the first note file being changed to the modified first thumbnail; and
display, when the second note file is closed, a fourth animation indicative of a reduction of at least one page of the second note file, the at least one page of the second note file being changed to the modified second thumbnail.

4. The electronic device of claim 1, wherein the hardware processor is further configured to:
close the first note file when a pinch-in operation is performed on the touch screen displaying the first page of the first note file in an editable manner by handwriting; and
close the second note file when a pinch-in operation is performed on the touch screen displaying the second page of the second note file in an editable manner by handwriting.

5. The electronic device of claim 1, wherein the hardware processor is further configured to:
select the first thumbnail or the second thumbnail when a pinch-out operation is performed on the touch screen displaying the first thumbnail and the second thumbnail.

6. The electronic device of claim 1, wherein the hardware processor is further configured to:
display at least a part of the pages of the first note file before displaying the first page of the first note file in an editable manner by handwriting; and
display at least a part of the pages of the second note file before displaying the second page of the second note file in an editable manner by handwriting.

7. The electronic device of claim 1, wherein the hardware processor is further configured to:
modify, when a first tag is attached to at least one page of the first note file, the first thumbnail based on the first tag; and
modify, when a second tag is attached to at least one page of the second note file, the second thumbnail based on the second tag.

8. A display method comprising:
displaying a first thumbnail indicative of a first note file at a first position on a touch screen and a second thumbnail indicative of a second note file at a second position on the touch screen wherein the first note file comprises pages comprising handwriting, the second note file comprise pages comprising handwriting, the first thumbnail comprises a first reduced image of a first page of the first note file, and the second thumbnail comprises a second reduced image of a second page of the second note file;
selecting the first thumbnail to open the first note file or the second thumbnail to open the second note file;
displaying, when the first thumbnail is selected, a first animation indicative of a movement of the first thumbnail from the first position to a third position on the touch screen display, the third position being closer to a center of the touch screen than the first position and indicative of an enlargement of the first thumbnail, and displaying the first page of the first note file in an editable manner by handwriting;
modifying, after the first page of the first note file is edited, the first thumbnail by changing the first reduced image to a third reduced image of an edited first page of the first note file and displaying a modified first thumbnail at the first position on the touch screen;
displaying, when the second thumbnail is selected, a second animation indicative of a movement of the second thumbnail from the first position to the third position on the touch screen display, displaying a fourth animation indicative of an enlargement of the second thumbnail at the third position on the touch screen, and displaying the second page of the second note file in an editable manner by handwriting;
modifying, after the second page of the second note file is edited, the second thumbnail by changing the second reduced image to a fourth reduced image of an edited second page of the second note file and displaying a modified second thumbnail at the second position on the touch screen.

9. The display method of claim 8, wherein the first thumbnail comprises a first icon to open the first note file and the second thumbnail comprises a second icon to open the first note file.

10. The display method of claim 8, further comprising:
displaying, when the first note file is closed, a third animation indicative of a reduction of at least one page of the first note file, the at least one page of the first note file being changed to the modified first thumbnail; and
displaying, when the second note file is closed, a fourth animation indicative of a reduction of at least one page of the second note file, the at least one page of the second note file being changed to the modified second thumbnail.

11. The display method of claim 8, further comprising:
closing the first note file when a pinch-in operation is performed on the touch screen displaying the first page of the first note file in an editable manner by handwriting; and
closing the second note file when a pinch-in operation is performed on the touch screen displaying the second page of the second note file in an editable manner by handwriting.

12. The display method of claim 8, wherein further comprising:
selecting the first thumbnail or the second thumbnail when a pinch-out operation is performed on the touch screen displaying the first thumbnail and the second thumbnail.

13. The display method of claim 8, further comprising:
displaying at least a part of the pages of the first note file before displaying the first page of the first note file in an editable manner by handwriting; and
displaying at least a part of the pages of the second note file before displaying the second page of the second note file in an editable manner by handwriting.

14. The display method of claim 8, further comprising:
modifying, when a first tag is attached to at least one page of the first note file, the first thumbnail based on the first tag; and
modifying, when a second tag is attached to at least one page of the second note file, the second thumbnail based on the second tag.

15. A non-transitory computer readable storage medium having stored thereon a computer program which is executable by a computer comprising a touch screen and a memory that stores a first note file and a second note file, wherein the first note file comprises pages comprising handwriting and the second note file comprise pages comprising handwriting; the computer program comprising instructions capable of causing the computer to execute functions of:

- displaying a first thumbnail indicative of the first note file at a first position on the touch screen and a second thumbnail indicative of the second note file at a second position on the touch screen wherein the first thumbnail comprises a first reduced image of a first page of the first note file and the second thumbnail comprises a second reduced image of a second page of the second note file;
- selecting the first thumbnail to open the first note file or the second thumbnail to open the second note file;
- displaying, when the first thumbnail is selected, a first animation indicative of a movement of the first thumbnail from the first position to a third position on the touch screen display, the third position being closer to a center of the touch screen than the first position and indicative of an enlargement of the first thumbnail, and displaying the first page of the first note file in an editable manner by handwriting;
- modifying, after the first page of the first note file is edited, the first thumbnail by changing the first reduced image to a third reduced image of an edited first page of the first note file and displaying a modified first thumbnail at the first position on the touch screen;
- displaying, when the second thumbnail is selected, a second animation indicative of a movement of the second thumbnail from the first position to the third position on the touch screen display, displaying a fourth animation indicative of an enlargement of the second thumbnail at the third position on the touch screen, and displaying the second page of the second note file in an editable manner by handwriting;
- modifying, after the second page of the second note file is edited, the second thumbnail by changing the second reduced image to a fourth reduced image of an edited second page of the second note file and displaying a modified second thumbnail at the second position on the touch screen.

* * * * *